(12) United States Patent
Redmond

(10) Patent No.: US 7,182,295 B2
(45) Date of Patent: Feb. 27, 2007

(54) PERSONAL FLIGHT VEHICLE AND SYSTEM

(75) Inventor: Scott D. Redmond, 601 Van Ness Ave., Suite E3613, San Francisco, CA (US) 94102

(73) Assignee: Scott D. Redmond, San Francisco, CA (US)

( * ) Notice: Subject to any disclaimer, the term of this patent is extended or adjusted under 35 U.S.C. 154(b) by 688 days.

(21) Appl. No.: 10/293,826

(22) Filed: Nov. 12, 2002

(65) Prior Publication Data

US 2004/0089763 A1    May 13, 2004

(51) Int. Cl.
B64G 1/00      (2006.01)
(52) U.S. Cl. .................................... 244/158 R
(58) Field of Classification Search ............ 244/158 R, 244/1 R, 4 A
See application file for complete search history.

(56) References Cited

U.S. PATENT DOCUMENTS

| | | |
|---|---|---|
| 1,802,860 A | 4/1931 | Zwinkel |
| 1,907,160 A | 5/1933 | Schauman |
| 1,974,483 A | 9/1934 | Brown |
| 2,207,576 A | 7/1940 | Brown |
| 2,309,584 A | 1/1943 | George |
| 2,417,347 A | 3/1947 | Brown |
| 2,460,175 A | 1/1949 | Hergenrother |
| 2,556,982 A | 6/1951 | Roos et al. |
| 2,585,810 A | 2/1952 | Mallinckrodt |
| 2,587,173 A | 2/1952 | Landgraf |
| 2,588,427 A | 3/1952 | Stringfield |
| 2,636,664 A | 4/1953 | Hertzler |
| 2,755,014 A | 7/1956 | Westendrop et al. |
| 2,765,975 A | 10/1956 | Lindenblad |
| 2,766,582 A | 10/1956 | Smith |
| 2,801,058 A | 7/1957 | Lent |
| 2,876,965 A | 3/1959 | Streib |
| 2,888,189 A | 5/1959 | Herb |
| 2,949,550 A | 8/1960 | Brown |
| 3,018,394 A | 1/1962 | Brown |
| 3,022,430 A | 2/1962 | Brown |
| 3,120,363 A | 2/1964 | Hagen |
| 3,187,206 A | 6/1965 | Brown |
| 3,196,296 A | 7/1965 | Brown |

(Continued)

FOREIGN PATENT DOCUMENTS

CA          675966          12/1963

(Continued)

OTHER PUBLICATIONS

Biefeld-Brown Effect. http://www.wikipedia.org/wiki/Biefeld-Brown_effect.*

(Continued)

*Primary Examiner*—Tien Dinh
(74) *Attorney, Agent, or Firm*—Blakely Sokoloff Taylor & Zafman LLP

(57) ABSTRACT

Various methods, apparatuses, and systems in which an electric-energy lifting panel levitates a user secured to the electric-energy lifting panel. The electric-energy lifting panel includes a first capacitive plate and a second capacitive plate having different geometric dimensions to generate a net-directional force. An ion conditioner ion enhances air around the first capacitive plate and the second capacitive plate.

25 Claims, 36 Drawing Sheets

U.S. PATENT DOCUMENTS

| | | | |
|---|---|---|---|
| 3,267,860 A | | 8/1966 | Brown |
| 3,296,491 A | | 1/1967 | Brown |
| 3,381,917 A | * | 5/1968 | Moore et al. |
| 3,448,791 A | * | 6/1969 | Clark |
| 3,495,791 A | * | 2/1970 | Drell et al. |
| 3,518,462 A | | 6/1970 | Brown |
| 3,818,700 A | * | 6/1974 | Kantrowitz et al. |
| 4,253,625 A | * | 3/1981 | Dmitrowsky |
| 4,379,532 A | * | 4/1983 | Dmitrowsky |
| 4,447,024 A | * | 5/1984 | Williams |
| 5,503,350 A | * | 4/1996 | Foote |
| 5,520,356 A | * | 5/1996 | Ensley |
| 5,675,103 A | | 10/1997 | Herr |
| 5,779,188 A | * | 7/1998 | Frick |
| 6,084,250 A | | 7/2000 | Jüstel et al. |
| 6,193,194 B1 | * | 2/2001 | Minovitch |
| 6,534,705 B2 | * | 3/2003 | Berrios et al. ............... 136/243 |
| 2001/0035750 A1 | | 11/2001 | Murphy |

FOREIGN PATENT DOCUMENTS

| | | |
|---|---|---|
| CA | 771815 | 11/1967 |
| CA | 876356 | 7/1971 |
| CH | 427 509 | 12/1966 |
| FR | 1.207.519 | 2/1960 |
| FR | 1.246.669 | 10/1960 |
| FR | 2 722 039 A3 | 1/1996 |
| GB | 300311 | 11/1928 |
| GB | 2 041 559 A | 9/1980 |
| GB | 2 213 440 A | 8/1989 |
| WO | WO 01/49084 A2 | 7/2001 |
| WO | WO 02/073218 A2 | 9/2002 |

OTHER PUBLICATIONS

Naudin, Jean-Lous. "How to build and replicate yourself the Lifter1 Experiment." Oct. 12, 2001. http://www.fortunecity.com/greenfield/bp/16/lftbld.htm.*

Naudin, Jean-Lous. "The Lifters Experiments." Oct. 19, 2001. http://www.fortunecity.com/greenfield/bp/16/lifters.htm.*

"Lifters in vacuum & why they do not work." Blaze Labs Research. http://www.blazelabs.com/1-vacuum.asp.*

Daniel Sieberg, "Personal 'jetpack' gets off the ground", web page: http://www.cnn.com/2002/TECH/ptech/02/06/solotrek.jetpack, Feb. 6, 2002, CNN Sci-Tech, pp. 2 total.

Todd Halvorson, "Spacewalkers Suited Up with Advanced Jet Packs", Cape Canaveral Bureau Chief, http://www.space/com/news/spaceshuttles/sts101_jetpack-safety.html, May 21, 2000, pp. 4 total.

K.D. Jones and M.F. Platzer, "Numerical Computation of Flapping-Wing Propulsion and Power Extraction", 35th Aerospace Sciences Meeting & Exhibit, AIAA-97-0826, Jan. 6-10, 1997/Reno, NV, pp. 17 total.

K.D. Jones and M.F. Platzer, "An Experimental and Numerical Investigation of Flapping-Wing Propulsion", 37th Aerospace Sciences Meeting & Exhibit, AIAA-99-0995, Jan. 11-14, 1999/Reno, NV, pp. 15 total.

K.D. Jones and M.F. Platzer, "Flapping-Wing Propulsion for a Micro Air Vehicle", 38th Aerospace and Sciences Meeting & Exhibit, AIAA-2000-0897, Jan. 10-13, 2000/Reno, NV, pp. 15 total.

Jim Noetzel, "Bell Rocket Belt", http://www.shreve.Net/~jnuts/fly/old/rocket_belt.html, Jun. 30, 1996, pp. 4 total.

Smithsonian National Air and Space Museum, "Rockets and Missiles Rocket Belt", NASM Space Artifacts: Rocket Belt, http://www.nasm.edu/nasm/dsh/artifacts/RM-Rocket_Belt.htm, copyright 1995-2000 Smithsonian, National Air and Space Museum, pp. 4 total.

International Search Report for International Application No. PCT/US 03/36453, 2 pages total.

* cited by examiner

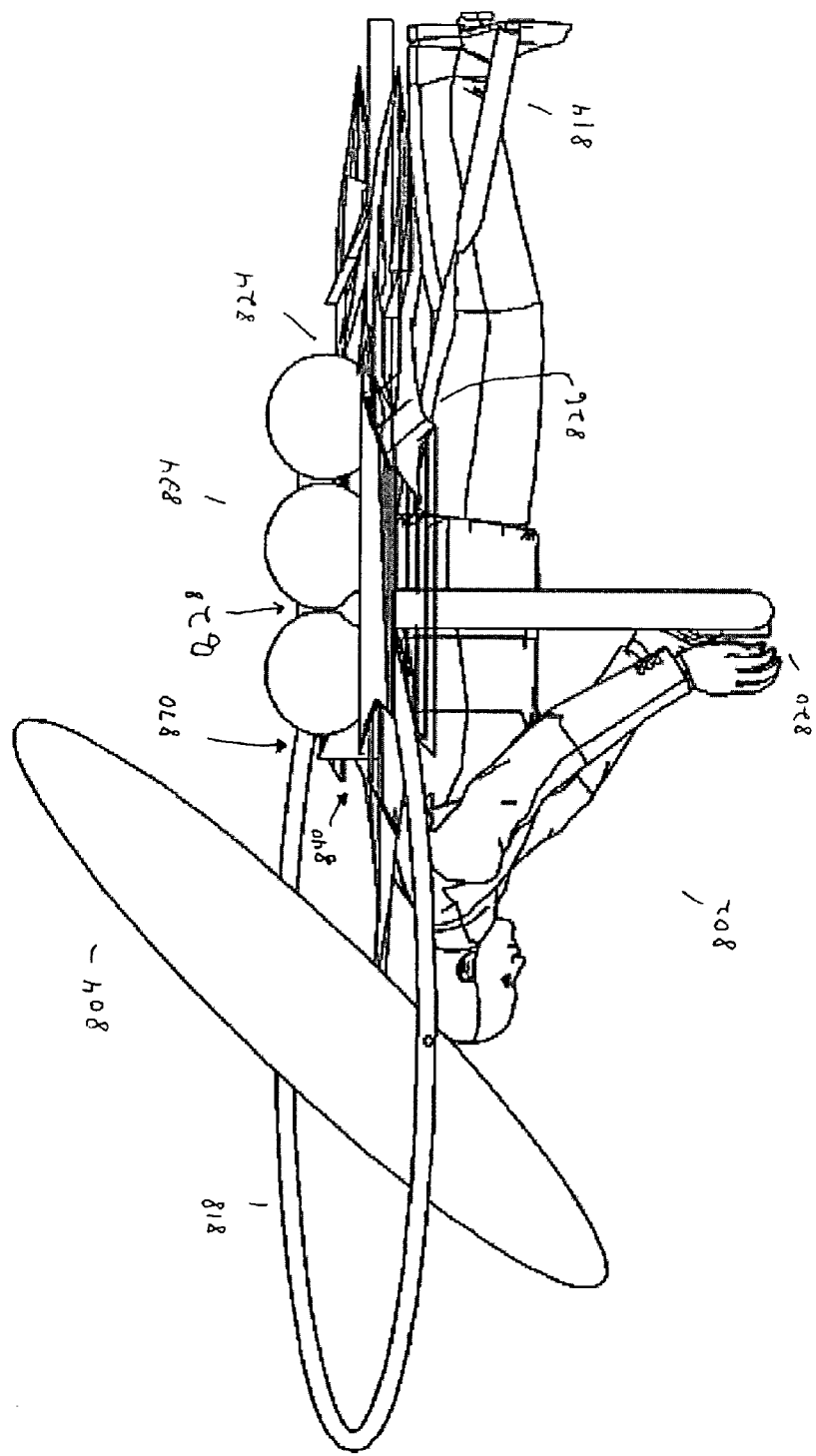

PERSONAL FLIGHT VEHICLE AND SYSTEM

FIELD OF THE INVENTION

Embodiments of the invention generally relate to flight systems. More particularly an aspect of this invention relates to a flight vehicle levitating a user via electric energy.

BACKGROUND OF THE INVENTION

Systems which allow a user to fly above the earth or in space exist today. Some current solutions rely on traditional rocket based thrust which cannot be sustained safely or for any functional duration and propellers which are unsafe and require a tremendous amount of fuel to achieve and maintain lift capability and maneuverability.

These rocket based flight systems can cause dismemberment and death upon failure and throw metal violently upon mishap. The fluid and electromechanics to operate them may be fragile and difficult to maintain. Typically, the systems to operate these rocket based flight systems are so complex and the forces involved so great that only specialized, heavily trained personnel can operate them.

Some propellers based flight systems may cause dismemberment and death upon contact and throw blades violently upon mishap. Usually propellers require tremendous mechanical effort to turn on and maintain velocity. Propellers require heavy engines to power them. Propellers may require a tremendous amount of fuel to achieve and maintain lift capability and maneuverability.

Both of the above systems can require runways, a great amount of space, and be uncomfortably noisy to a human user.

Traditionally, experimental Ion processing and Ion-Wind based lift systems utilize a high-voltage corona-effect to create aerial propulsion. The high-voltage current works by ionizing air-molecules, which are then transported from an emitter to a collector through the surrounding atmosphere. In a manner similar to a propeller or helicopter rotor, the Ion processing is able to move a mass of air, which in turn causes propulsion.

A shortcoming of maintaining a high-voltage is the amount of power required to create the voltage in the first place. The electrical-engineering formula (voltage× current=power) provides some insight into the nature of this problem. To create a conduction channel at 80,000 volts and 1 mA of current, the amount of power required is 80 watts. If it is determined that a voltage on the order of 160,000 volts creates a more powerful conduction-channel than the initial 80,000 volt charge does, then the power requirements double to 160 watts.

Another shortcoming of a high voltage Ion-Wind based propulsion system is unshielded systems during operation produce a significant amount of X-Radiation. While exposure of this sort can be shielded with advanced materials and by engineering the passenger compartment to be distanced from the source of X-Ray emissions, any ion-wind technology utilizing high-levels of both voltage and current will rapidly produce unreasonably high amounts of X-radiation.

Another major consideration for a high-current device utilizing high-voltage electricity to create propulsion is the inherently "messy" nature of high-voltage ion-effect electricity. Ion-wind is seldom as clean as it looks, in that quite often static electricity builds up on nearby surfaces, causing damage to instrumentation and in some cases even a dangerous shock potential.

SUMMARY OF THE INVENTION

Various methods, apparatuses, and systems in which an electric-energy lifting panel levitates a user secured to the electric-energy lifting panel. The electric-energy lifting panel includes a first capacitive plate and a second capacitive plate having different geometric dimensions to generate a net-directional force. An ion conditioner ion enhances air around the first capacitive plate and the second capacitive plate.

BRIEF DESCRIPTION OF THE DRAWINGS

The drawings refer to the invention in which:

FIG. 8a illustrates a side view of an embodiment of the personal flight vehicle having an electric-energy lifting panel located above the user.

Figure 1:
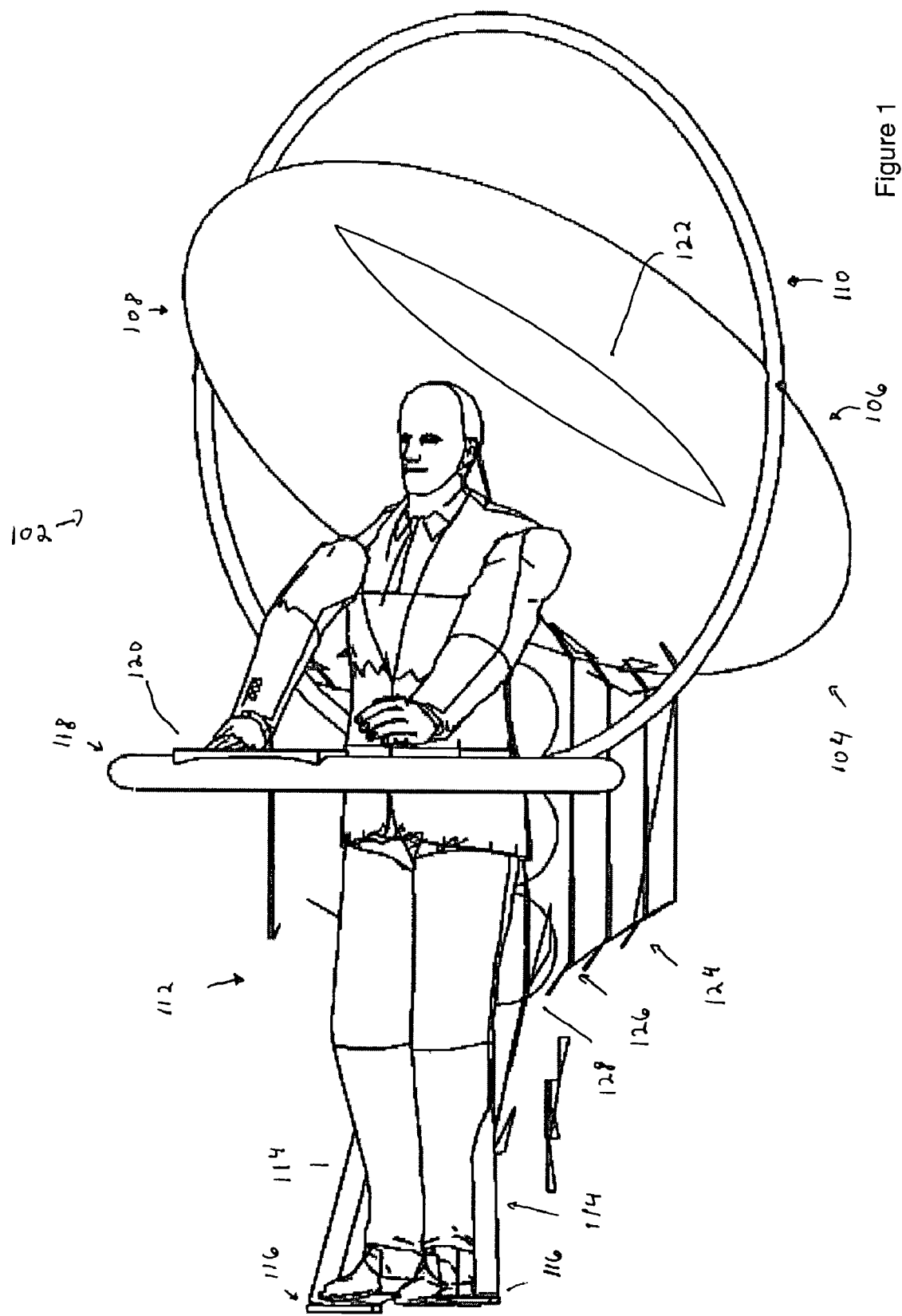
FIG. 1 illustrates an offset front side view an embodiment of a personal flight vehicle having an electric-energy lifting panel that levitates a user via electric-energy and a gaseous propulsion system to supply directional thrust for the flight vehicle.

While the invention is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives failing within the spirit and scope of the invention.

DETAILED DISCUSSION

In the following description, numerous specific details are set forth, such as examples of specific data signals, named components, connections, number of memory columns in a group of memory columns, etc., in order to provide a thorough understanding of the present invention. It will be apparent, however, to one of ordinary skill in the art that the present invention may be practiced without these specific details. In other instances, well known components or methods have not been described in detail but rather in a block diagram in order to avoid unnecessarily obscuring the present invention. Thus, the specific details set forth are merely exemplary. The specific details may be varied from and still be contemplated to be within the spirit and scope of the present invention. The term coupled is defined as meaning connected either directly to a component or indirectly through another component.

In general, various methods, apparatuses, and systems are described in which an electric-energy lifting panel levitates a user secured to the electric-energy lifting panel. The electric-energy lifting panel includes a first capacitive plate and a second capacitive plate having different geometric dimensions to generate a net-directional force. An ion conditioner enhances ions in the air around the first capacitive plate and the second capacitive plate.

FIG. 1 illustrates an offset front side view an embodiment of a personal flight vehicle having an electric-energy lifting panel that levitates a user via electric-energy and a gaseous propulsion system to supply directional thrust for the flight vehicle. Embodiments of the personal flight vehicle 102 may have one or more of the following components.

An electric-energy lifting panel 104 that has a first capacitive plate 106 and a second capacitive plate 108 having different geometric dimensions. The electric-energy lifting panel 104 levitates a user secured to the flight vehicle 102 via electric energy. A tortuous pivot frame 110 couples to the electric-energy lifting panel 104 to allow the electric-energy lifting panel 104 to redirect vertical lift to horizontal thrust.

A body harness 112 having vertical telescoping posts 114 with foldout footpads 116 and a flip and lock waist dashboard 118 to secure the user to the personal flight vehicle 102. The footpads 116 may have extension heel rests and landing feet. The body harness 112 may also have belts to secure the user to the flight vehicle 102. A front panel navigation system 120 may mount on the flip and lock waist dashboard 118.

The capacitive plates 106, 108 may include, for example, a set of parallel and layered series of lifting cells and an emitter wire. An ion conditioner 122, such as ultra-violet-light emitting bulbs, an Excimer laser or other similar device, may condition air in between and around the capacitive plates 106, 108. The ion conditioner 122, such as ultra violet light emitting bulbs, may be mounted in an array on the underside of the electric-energy lifting panel 104.

A gaseous propulsion system 124 provides directional thrust for the personal flight vehicle 102. The gaseous propulsion system 124 couples to the body harness frame 112. The gaseous propulsion system 124 may use an air-breathing rocket 126 with hydrogen fuel support 128.

Figure 2A:
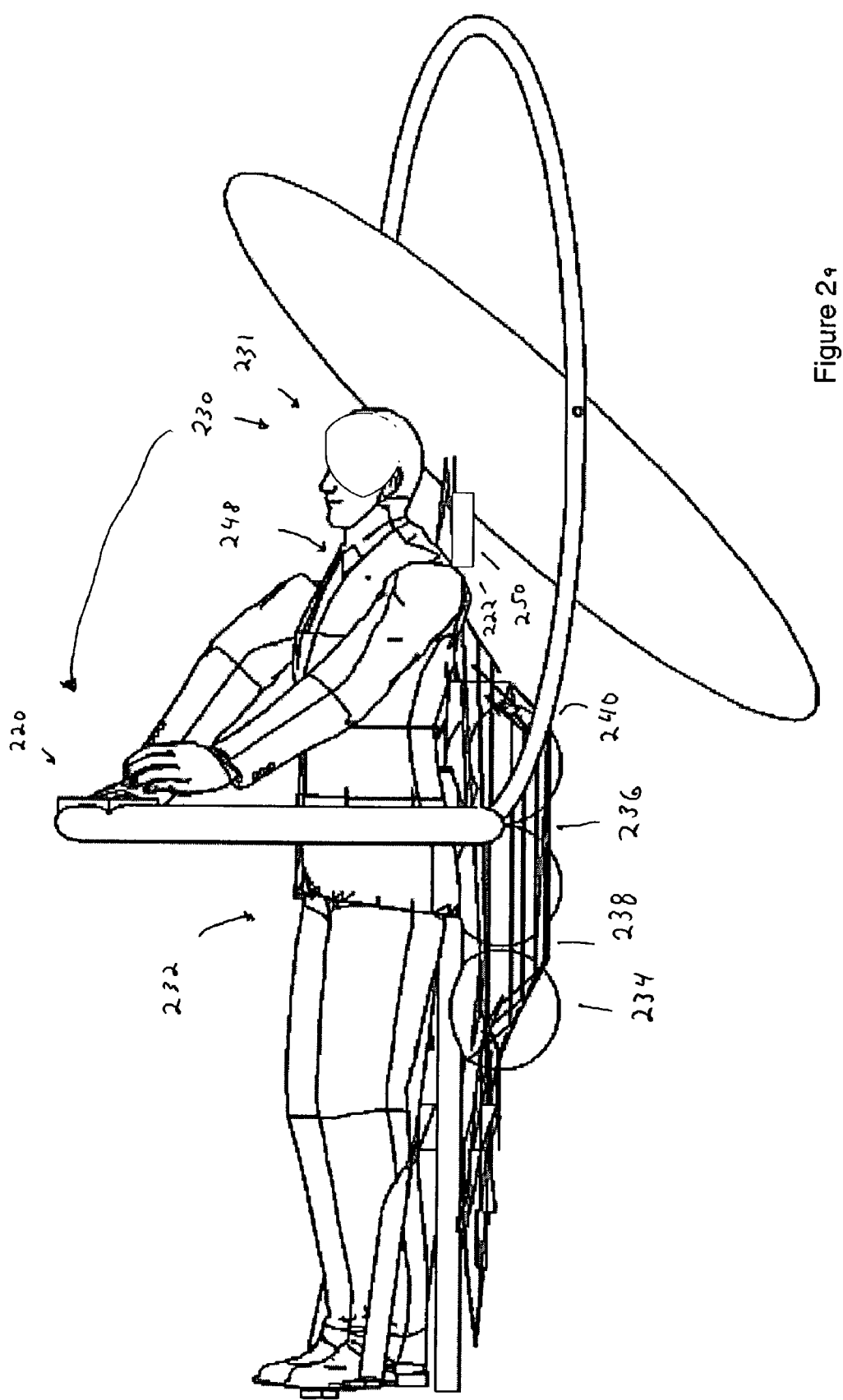
FIG. 2a illustrates a side view of an embodiment of a personal flight vehicle in which the user is using an embodiment of a flight situation display system.

FIG. 2a illustrates a side view of an embodiment of a personal flight vehicle in which the user is using an embodiment of a flight situation display system. The flight situation display system 230 may be built into a visor connected to a users helmet 231. The global positioning system navigation system 220 may send and receive data to the flight situation display system 230. The helmet 231 as well as the user flight suit 232 have Electro Magnetic Field shielding built into these components.

Figure 2B:
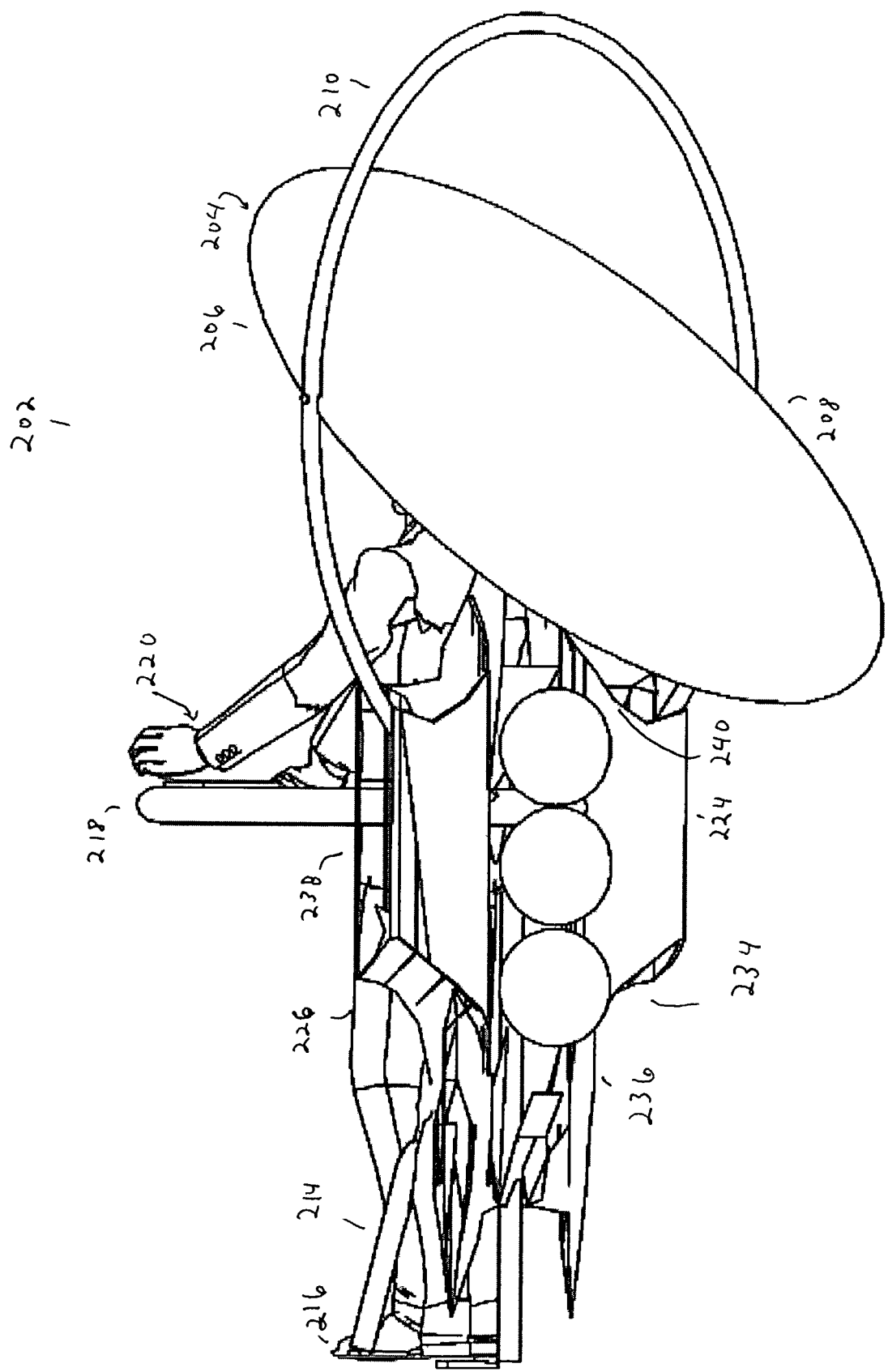
FIG. 2b illustrates an offset rear view of an embodiment of a personal flight vehicle.

FIG. 2b illustrates an offset rear view of an embodiment of a personal flight vehicle. Uncondensed hydrogen cylinders 234 attach to the frame of the gaseous propulsion system 224. The Uncondensed hydrogen cylinders 234 are part of a solid-state hydrogen storage and recovery system 236. The solid-state hydrogen storage system provides hydrogen to the fuel cells 238 located underneath the uncondensed hydrogen cylinders 234. The solid-state hydrogen storage system also provides hydrogen to the air-breathing rockets 226. The fuel cell stack 238 also connects to the atmosphere in that the fuel cells 238 may use air as an oxidizer.

An inductive transformer stack 240 also is located under the uncondensed hydrogen cylinders 234. The inductive transformers 240 receive electric energy from one or more ground-based towers. The inductive transformers 240 supply this electric-energy to the first capacitive plate 206 and the second capacitive plate 208. The first capacitive plate 206 and a second capacitive plate 208 having different geometric dimensions generate a net-directional force to levitate the flight vehicle 202 and the user secured to the personal flight vehicle 202. The ion enhanced air gap between and around the capacitive plates 206, 208 decreases the amount of power required to lift a given amount of weight.

Figure 3:
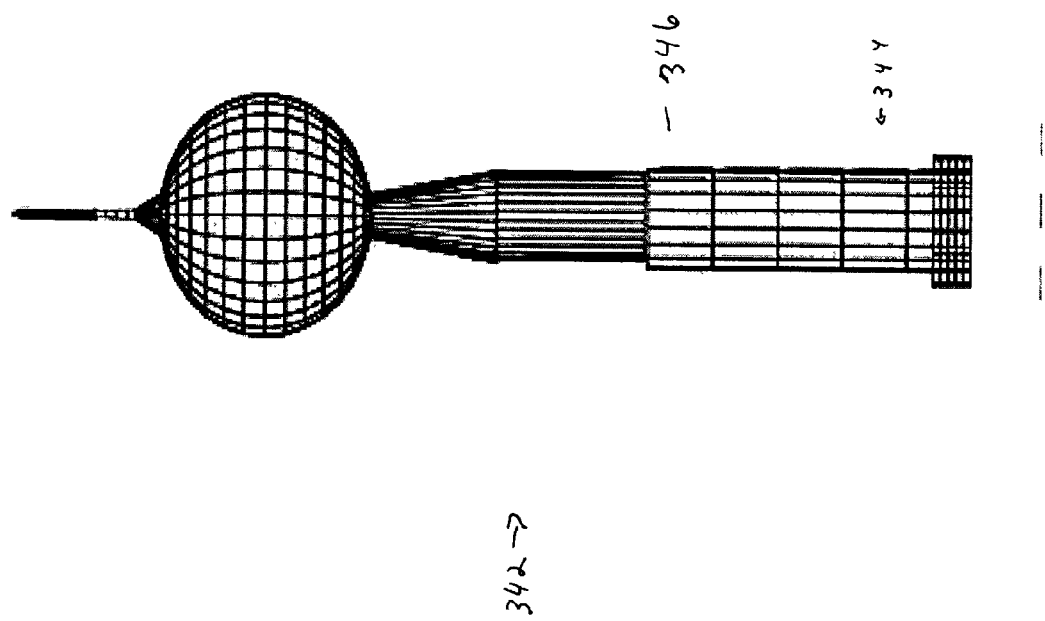
FIG. 3 illustrates a side view of an embodiment of a ground based power distribution tower to inductively supply power to the inductive transformers in the flight vehicle.

FIG. 3 illustrates a side view of an embodiment of a ground based power distribution tower to inductively supply power to the inductive transformers in the flight vehicle. The ground based power distribution tower 342 may have high voltage Direct Current power-supply 344 to inductively provide a pulsating Direct Current to the onboard inductive transformers. The ground based tower 342 may also have electromagnetic field shielding 346 in place.

Referring to FIG. 2a, a canister 248 containing an emergency parachute or parasail also connects the frame of the gaseous propulsion system 224. Note, the components can vary on where and how they connect to one another. For example, the ion conditioner 222, such as a laser 250, may attach to the top part of the frame of the gaseous propulsion system 224. Even the electric-energy lifting panel 204 may be located underneath the user.

Figure 4:
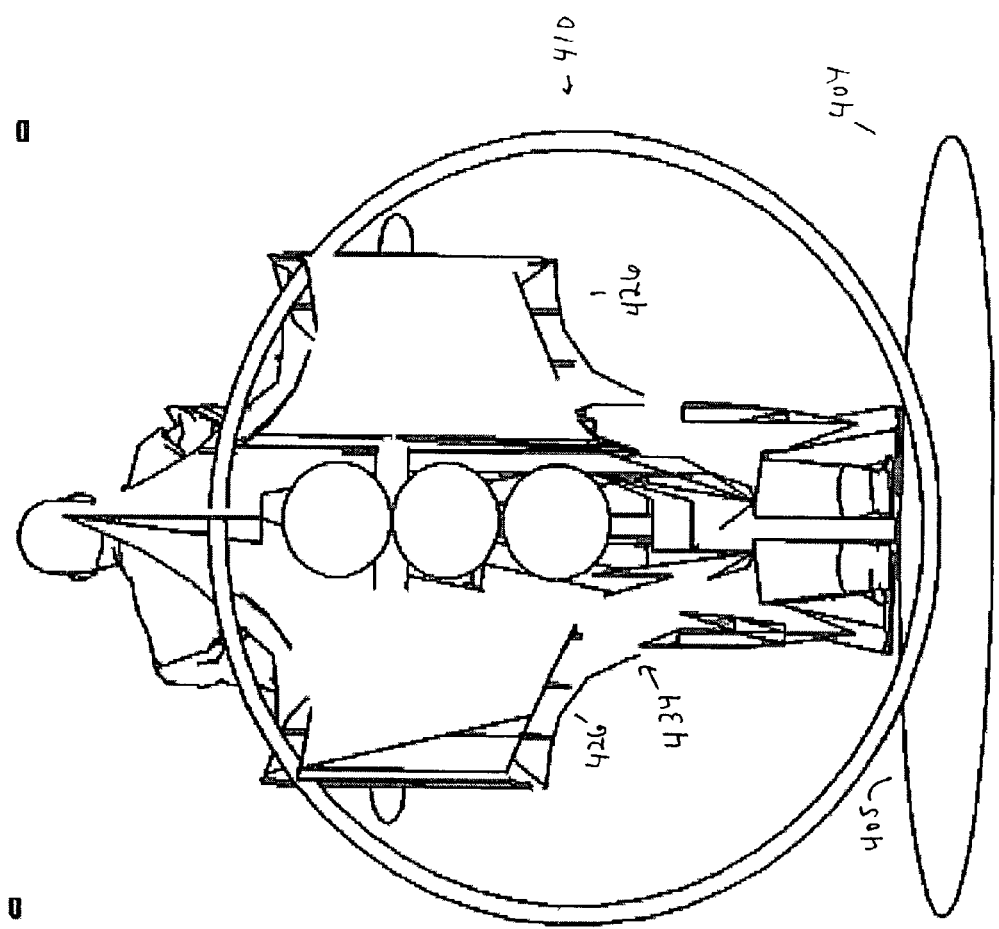
FIG. 4 illustrates a back view of an embodiment of a personal flight vehicle having an electric-energy lifting panel located underneath the user.

FIG. 4 illustrates a back view of an embodiment of a personal flight vehicle having an electric-energy lifting panel located underneath the user. In this embodiment, the electric-energy lifting panel 404 located underneath the user. The electric-energy lifting panel 404 has an added shielding layer 405 of built into a portion of the electric-energy lifting panel 404 in order to shield the user from the Electro Magnetic Field generated by the electric-energy lifting panel 404. The tortuous pivot frame still 410 couples to the electric-energy lifting panel 404 to allow the electric-energy lifting panel 404 to redirect vertical lift to horizontal thrust. The air-breathing rockets 426 provide directional thrust and additional lift for initial lift off.

Figure 5:
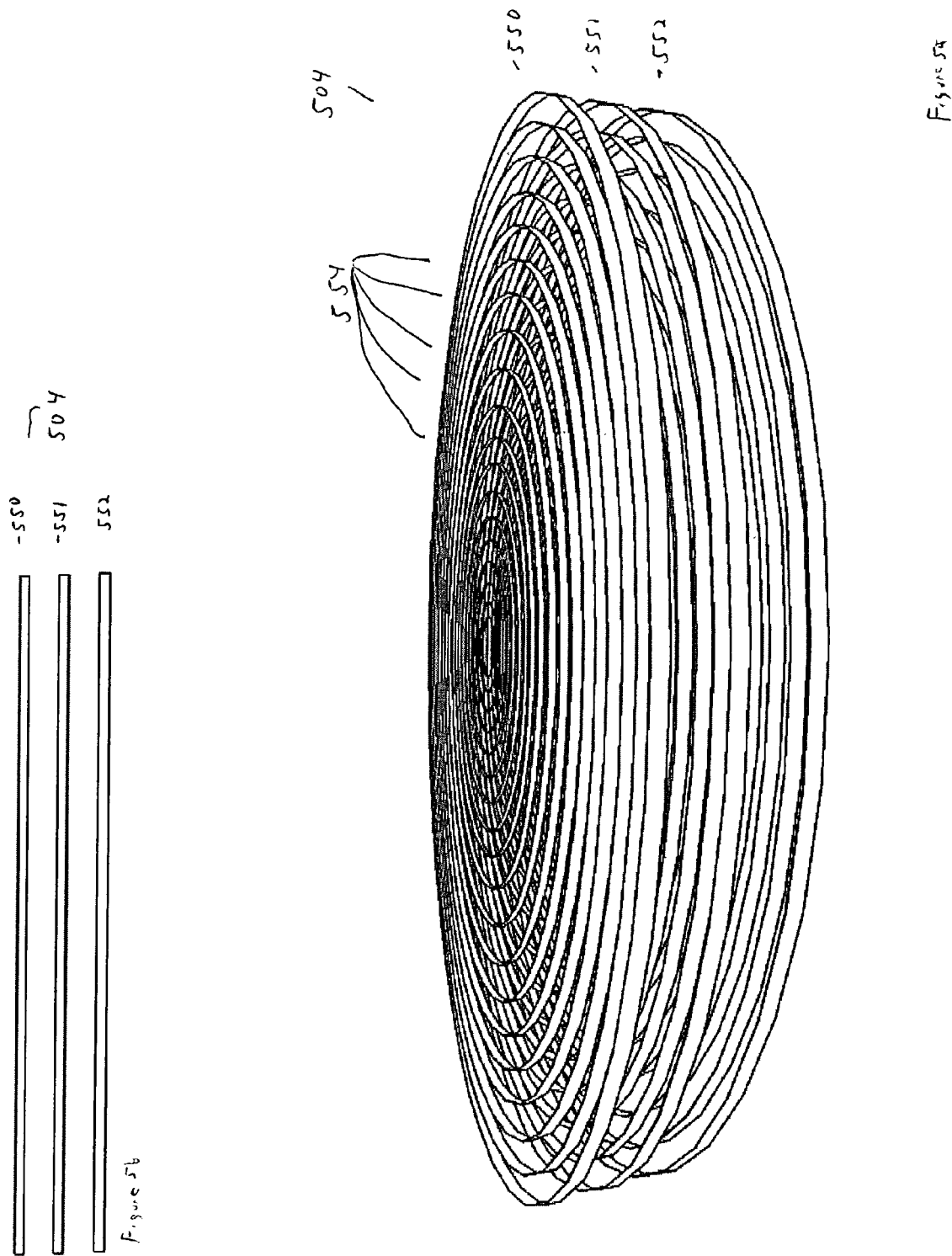
FIGS. 5a and 5b illustrate an exploded view of a portion of an embodiment of an electric-energy lifting panel having an ion plate array layer to form the first part of the capacitance plate system.

FIGS. 5a and 5b illustrate an exploded view of a portion of an embodiment of an electric-energy lifting panel having an ion plate array layer to form the first part of the capacitance plate system. In this example, the electric-energy lifting panel 504 has three layers 550, 551, 552 of parallel and layered series of ion plate arrays. The ion plates form concentric rings of differing geometric sizes 554. Each of the concentric rings 554 is stacked on top of one another in the layers 550, 551, 552. Note, three layers are only an example number of layers in various embodiments of the electric-energy lifting panel 504.

Figure 6:
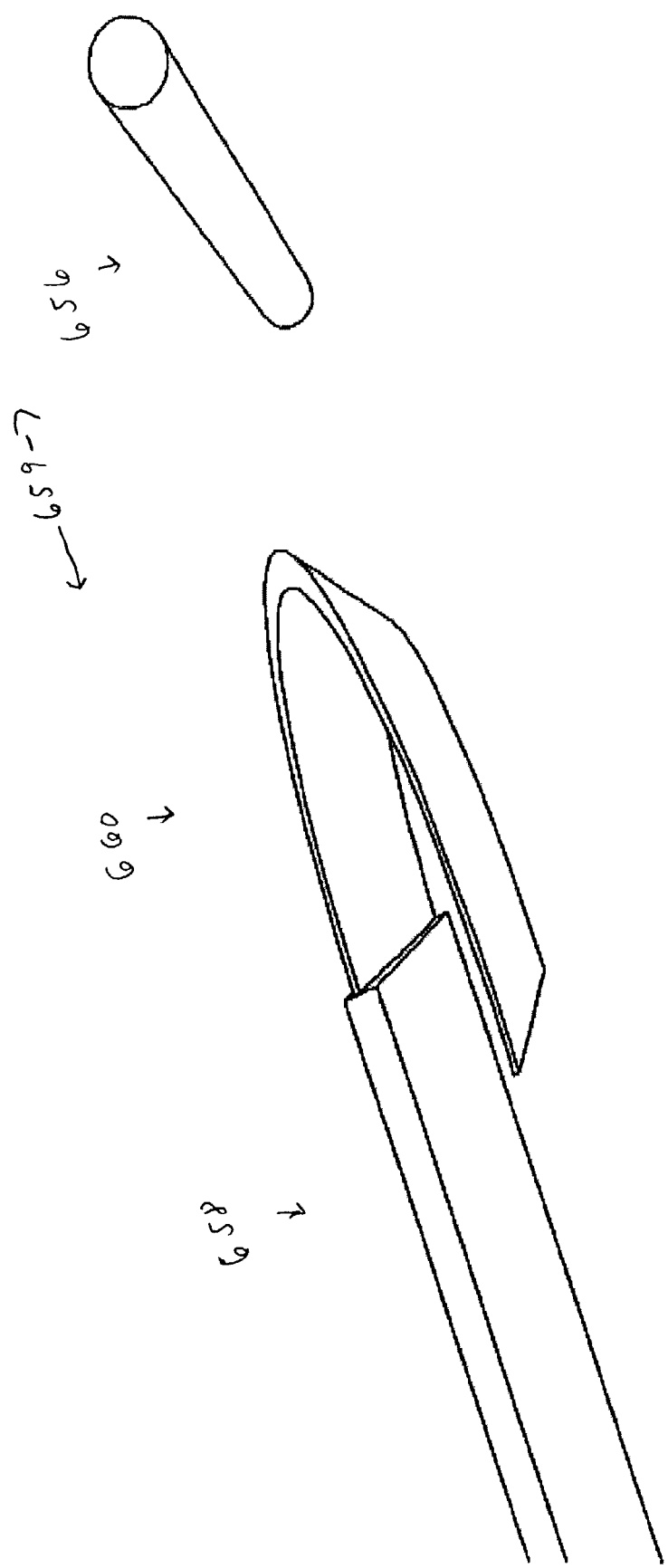
FIG. 6 illustrates an offset side view of an embodiment of an ion plate bent over at the top and the relationship of an emitter wire to the ion plate.

FIG. 6 illustrates an offset side view of an embodiment of an ion plate bent over at the top and the relationship of an emitter wire to the ion plate. An emitter wire 656, such as a Corona wire, may form the second part of the capacitance plate system. An ion-enhanced air-gap 659 may exist between and around the ion plate 658 and the emitter wire. The ion plate may be bent over at the top edge 660 of the ion plate 660. Multiple ion plates may form concentric rings of ion plates of various geometric shapes and dimensions.

Referring to FIG. 5a, the top edge of those concentric rings of ion plates 554 may be bent over pointing toward the ground.

Figure 7B:
FIGS. 7a and 7b illustrate an exploded view of an embodiment of an electric-energy lifting panel having multiple layers of emitter wires stacked on top ion plate array layers.
Figure 7A:
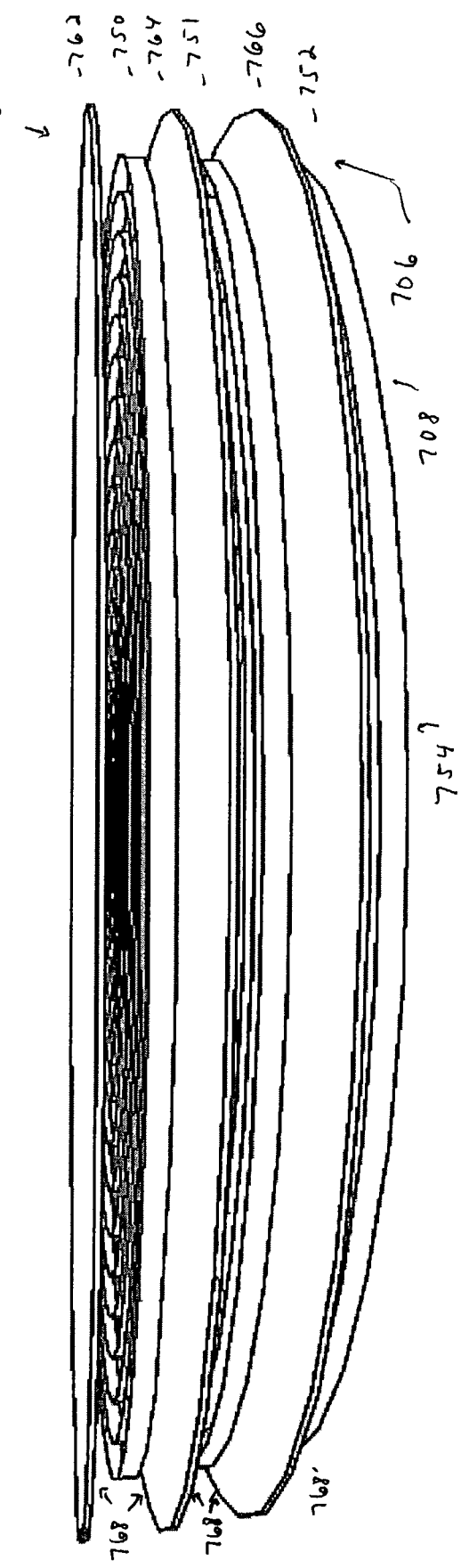

FIGS. 7a and 7b illustrate an exploded view of an embodiment of an electric-energy lifting panel having multiple layers of emitter wires stacked on top ion plate array layers. An embodiment of the electric-energy lifting panel 704 may have three main components, the shell of the disk (not shown), one or more emitter wire layers 762, 764, 766, and one or more ion plate arrays 750, 751, 752. An embodiment may have a series of layered concentric ion plates 750, 751, 752 and a series of emitter wires 762, 764, 766 relating to the series of layered concentric ion plate arrays 750, 751, 752. A gradient electrostatic-field 768 may exist between each set of emitter wire layer and ion plate array, such as the first emitter wire layer 762 and the first ion plate array 750. These two elements compose a low-efficiency, high-voltage air-gap capacitor in which the difference in geometries between the two capacitive elements generates a net-directional force from the larger element towards the smaller element. There may be both a leakage current and a capacitance current between the emitter wire layer 762 and the ion plate array 750. The electric-energy lifting panel 704 may use a manifestation of ion-wind. The electrons crossing the air-gap cause a breeze that causes a thrust. The breeze travels down from the emitter wire layer 762 to the ion plate array 750 to generate an upward thrust for the electric-energy lifting panel 704.

In an embodiment, ion-wind comes from electrons emitted from the small-diameter of the positively charged emitter wire layer 750 in such great abundance that these electrons move a significant airflow down to the ion plate array 750 where these electrons are absorbed and transported electrically back to the High Voltage (HV) power-supply's electrical ground. In an embodiment, the ion plates bend over at the top so that the top and bottom are pointing at the ground to aim the ion path downwards to generate thrust.

Another possible source of the upward thrust comes from an Electro Magnetic Field moving up through the ion plate array 750 to the emitter wire layer 762. However under any analysis the electric-energy lifting plate 704 lifts the user via electric force/energy manipulation.

The Biefeld-Brown Effect proves that highly charged capacitors when properly suspended showed a tendency to move relative to the gravitational force. When the poles of a freely suspended charged capacitor (even in vacuum) are placed on a horizontal axis, a forward thrust would be produced which would move the capacitor in the direction of the positive pole. The direction of thrust would reverse in conjunction with a polarity change. This is the phenomenon known as the Biefeld-Brown Effect. The components forming the capacitive plates 706, 708, such layers of emitter wires and ion plate arrays, in electric-energy lifting plate may make use of this Biefeld-Brown Effect.

The intensity of the Biefeld-Brown Effect may depend on several factors: 1) the surface area of the plates; 2) the voltage differential between the plates; 3) the proximity of the plates to each other; 4) the material mass between the plates; 5) the dielectric capacity between the plates; as well as some other factors.

Capacitors store electrical charge. Under a theory of the Biefeld-Brown Effect, the above five factors contribute to the total charge stored in a capacitor, which is the total charge flow that occurs in the capacitor during its charging process. When a capacitor is connected to a dc supply, the positive terminal attracts electrons from the negative terminal even through vacuum environment. The electron flow stops when the electrons on the negative plate repel other electrons and stop them from reaching the plate. At this point a capacitor is said to be fully charged. However, no dielectric is a perfect insulator, and so a charging current will always be present, with the greatest flow occurring during initial charging.

Under one ion-wind theory, the volume of current does more work than the voltage that it travels at. The only requirement for the magnitude of the voltage is to have enough to conduct through the air gap. The volume of ions is doing most of the work to create thrust, not the ions' speed. Further, when the ion condition generates an ion enhanced air gap in between and around the capacitive plates, then the magnitude of the voltage required to create the ion wind effect also lowers. Also, lowering the magnitude of the voltage between the capacitive plates 706, 708 and the speed of the ions but using far many more of them increases thrust through the aerodynamic linkage between the cumulative mass of ions and the surrounding air. The theories will be described in more detail later.

The emitter wire layer and ion plate array be only one layer thick. However, massively parallel and layered series of sets of emitter wires 762, 764, 766 related ion plate arrays 750, 751, 752, working in parallel, can contribute to greater stability and higher force output than any single lifting element.

The distance between the capacitive elements can be automatically adjusted by user control or by the automated navigation system. Changing the distance between the capacitive elements acts to increase or decrease lift. An electromechanical movement system can act to change the distance between the concentric rings 754 or between the emitter wire layer 762, 764, 766 and corresponding ion plate array 750, 751, 752. Alternatively, a software/electronic control system can act to change that distance. The energy to any section, segment or sub segment may be fully addressable in that a particular ion plate concentric ring and can have its power turned up, down or sequenced for maneuverability. An electronic control system can manage the power provided by the inductive transformer array to each ion plate concentric ring.

In an embodiment, the electric-energy lifting panel 704 may be manufactured as a layered material. One or more of those layers is the emitter wire layer 762, 764, 766, which may be highly charged with about 30 kV worth of electrons. Another layer is the concentric ion plate arrays 750, 751, 752 in almost any geometric shape or size. The emitter wire layer 762, 764, 766 may be made from thin film deposition that traces out the exact pattern of the Ion array under the emitter wire. The emitter wire layer 762, 764, 766 may have addressed energy sections and segments that match those in the ion plate area below the emitter wire array. The emitter wire may be coated or polarized. The thin film plate process could use layered metallics containing several hundred microscopically thin layers of magnesium and bismuth deposited via electron-deposition technology, to help produce an absence of oxygen-molecules between the different layers of metals. As discussed previously, another layer is the air-gap 769 between the emitter wire layer 766 and ion plate array 752. The air gap 769 may be for example, 3 cm in height. Another layer may be an electrically-grounded "skirt" of aluminum plate that surrounds a portion of the electric-energy lifting panel. The aluminum plate may be part of the disk shell surrounding the electric-energy lifting panel. The disk shell has mounting points so that the entire electric-energy lifting panel 704 may pivot vertically or laterally within the tortuous pivot frame. In an embodiment, the electric-energy lifting panel 704 may be an inflatable Mylar disk comprised of massively layered thin film sections and one or more areas inflated by the flight vehicle's own hydrogen.

FIG. 8a illustrates a side view of an embodiment of the personal flight vehicle having an electric-energy lifting panel located above the user. The personal flight vehicle 802 is capable of both rapid and gradual lofting via either the rocket or the electric-energy lifting panel 804. The personal flight vehicle 802 is capable of silent flight via the electric-energy lifting panel 804. Additionally, the personal flight vehicle 802 may employ the gaseous propulsion system 824 for additional thrust or maneuverability.

Figure 8B:
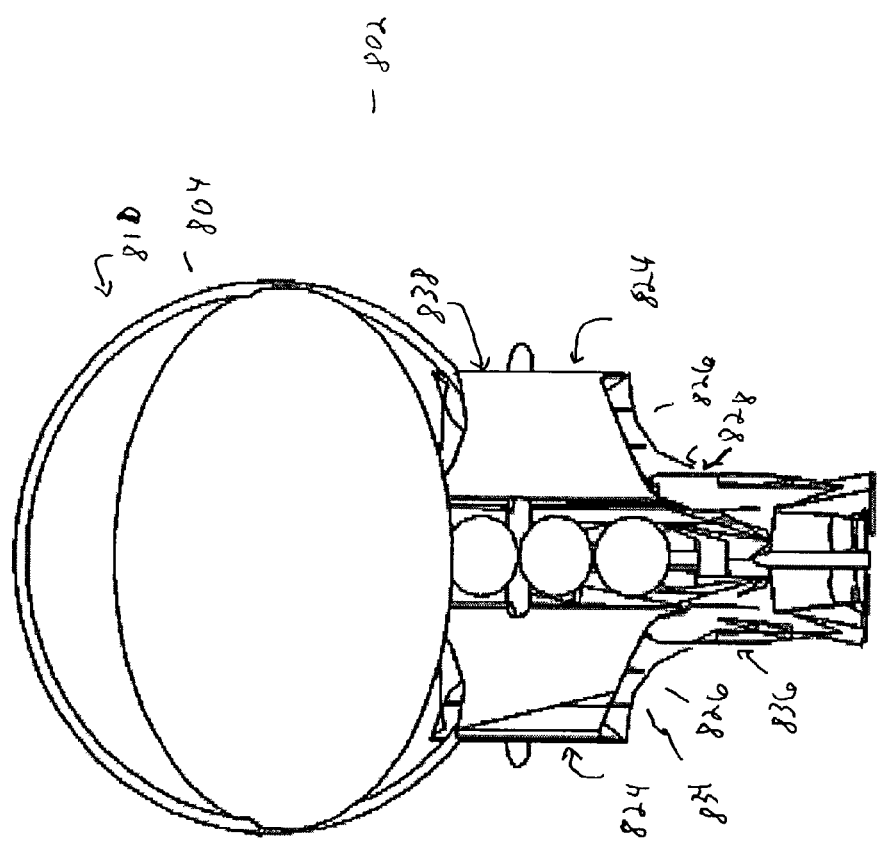
FIG. 8b illustrates a back view of an embodiment of the personal flight vehicle.

FIG. 8b illustrates a back view of an embodiment of the personal flight vehicle. The gaseous propulsion system 824 uses a thrust jet funnel system. The thrust jet funnel system may employ hydrogen-air combustion start/air oxidizer to provide directional thrust for rapid lifting, landing support and pitch, roll, and yaw support.

The rocket portion of the system is an air-breathing rockets 826 with hydrogen fuel support 128. The rocket portion of the system 826 has a slow loft system that allows normal human control. In an embodiment, a tactical version of the personal flight vehicle 802 may have a rocket portion 826 with an increased thrust support system that a skilled operator should be able manage.

In an embodiment, the rocket portion 826 employs a version of the Cruise Missile "Williams research" engines. The thrust aspect of the device uses a rocket-based, combined cycle engine. The combined cycle engine sucks in air. The combined cycle engine then compresses the air, combines it with a fuel, and burns the product, which expands and provides thrust. Air is taken in by the system and compressed by an onboard compressor. The air is then injected into an airflow at the thrust nozzles. Fuel is added to the airflow, where the two mix and burn. Fuels most likely to be used with the air-breathing rockets 826 include hydrogen or hydrocarbon fuel. In an embodiment, the efficiency of the thrusters jumps dramatically to much higher efficiency than even an aircraft once you pre-ionize the air and use a lower voltage. The personal flight vehicle 802 can also produce more thrust then is anticipated but at the expensive of fuel economy. When additional power is required, the vehicle can use both its hydrogen thrust system 824 and the induction transformer amplification 840.

The solid-state hydrogen storage and recovery system 836 can supply hydrogen to the rocket portion 826. The solid-state hydrogen storage and recovery system 836 can also supply hydrogen to the fuel cell stack 838 located underneath the uncondensed hydrogen canisters 834. The fuel cell stack 838 uses air as an oxidizer after initial liftoff via the hydrogen fuel. In an embodiment, the use of a fuel cell stack 838 dramatically reduces the overall weight of the personal flight vehicle 802 compared to others possible flight units by eliminating significant on-board fuel requirements. Thus, the personal flight vehicle 802 may provide a safe, low-noise, long-duration flight capability with more user control and functionality.

Further the fuel cells 838 may provide a separate independent supply electrical power to the personal flight vehicle 802. Alternatively, the personal flight vehicle 802 may use on-board beta-decay nuclear DC batteries 870 to provide an independent source of electrical power. In an embodiment, the beta-decay nuclear DC batteries 870 may be either Stimulated Beta-Decay nuclear DC batteries or Conventional Beta-Decay nuclear DC batteries. The voltage range of the batteries may be, for example, 12 VDC or 115 VDC.

Figure 9:
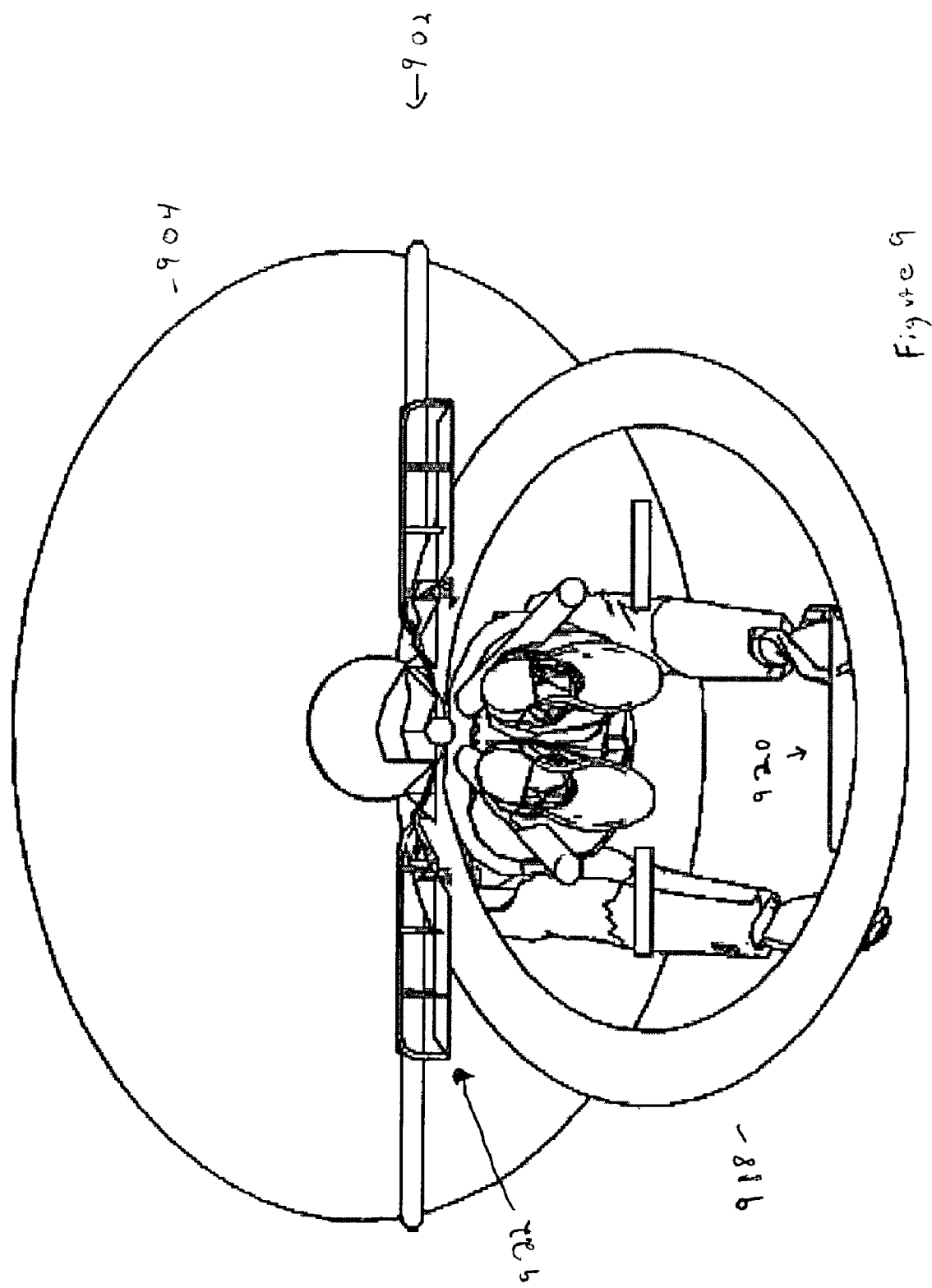
FIG. 9 illustrates a bottom up view of an embodiment of personal flight vehicle having an ion conditioner to generate an ion enhanced air-gap between and around the capacitive plates.

FIG. 9 illustrates a bottom up view of an embodiment of personal flight vehicle having an ion conditioner to generate an ion enhanced air-gap between and around the capacitive plates. Referring to FIG. 9, the ion conditioner 922 may be ultra violet light emitting bulbs, such as LEDs or bulbs for an EPROM eraser, grouped in sectional arrays of hundreds of these bulbs. Each ultra violet light emitting bulb may have a fairly narrow focus beam. Most of the light produced by the UV Photon may be just outside the visible spectrum (370 nm). In full darkness, the UV bulbs may cause objects to fluoresce at distances of 20 feet or more. In bright daylight, the UV bulbs the effectiveness may be about 6–12 inches. A plastic-pipe may support a wire-mesh on both ends—one end positive, the other negative, and UV-bulbs in between. In an embodiment, when the UV bulbs substantially ionize all of the air in or by the pipe, electricity flows between the mesh ends and carry a net airflow with it.

In an embodiment, any two metallic surfaces may be used as terminals and the one or more UV bulbs connected in between the metallic surfaces. The pipe may have side inlet/outlet to further direct airflow in the presence of the UV ionization. Either way the Ultraviolet light can be used to enhance the conductivity of the atmosphere, which can then conduct electricity at otherwise non-ionizing voltage potentials.

In an embodiment, no emitter wire layer is used in the panel because the pre-ionized air would more readily pick up conduction-charges without using the fine-tip of the emitter wire. The UV light-source may be located inside of a coated aluminum mirroring jacket to boost the efficiency of ionization without expending excess energy. Thus, two flat ion plates in an airflow tube should work adequately. The Aluminum may accompany a silicon oxide or magnesium fluoride overcoat. The overcoating provides a surface rugged enough for normal handling and cleaning, and it provides an effective seal that reduces aging effects in the aluminum film.

The ion conditioner 922 reduces the magnitude of the voltage to conduct through the air gap and the total power-requirements. Additionally, at lower voltages, a lower X-ray production occurs because the X-rays from the UV ionizing source are absorbed by surrounding material such as metal, glass, or plastic. Also, at lower-voltages the personal flight vehicle 902 generates less ozone and other byproducts.

Figure 10:
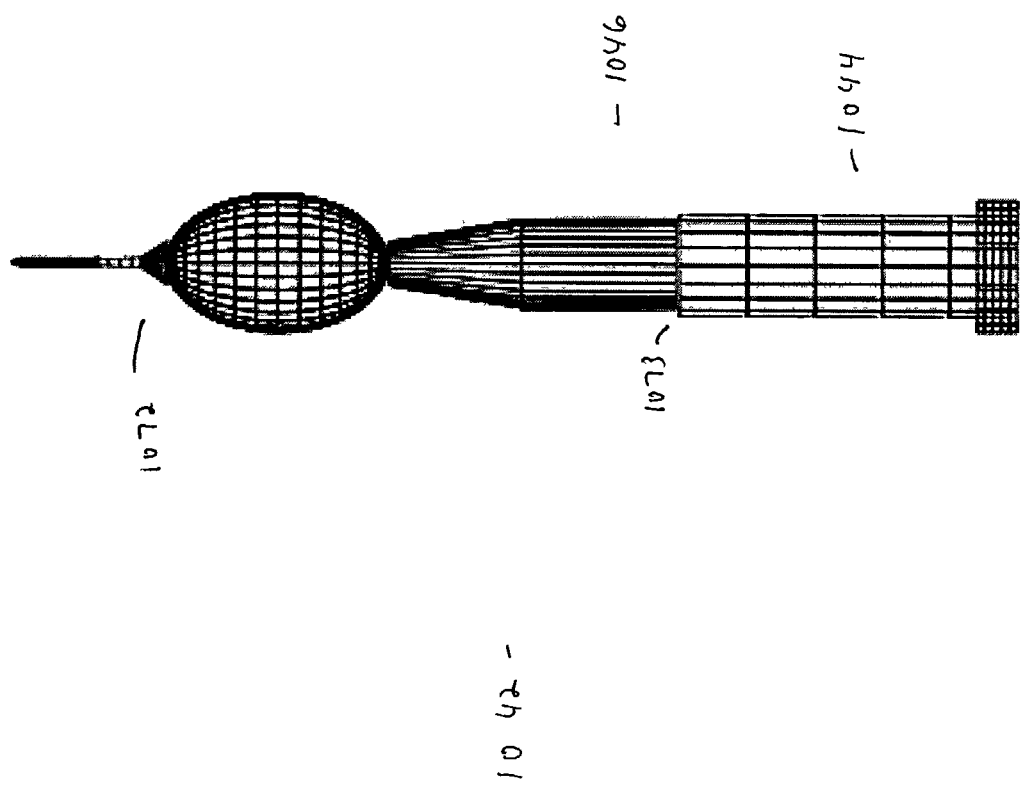
FIG. 10 illustrates a front view of an embodiment of a ground based power distribution tower having a high voltage Direct Current power-supply to inductively supply a pulsating Direct Current to the inductive transformers in the personal flight vehicle.

FIG. 10 illustrates a front view of an embodiment of a ground based power distribution tower having a high voltage Direct Current power-supply to inductively supply a pulsating Direct Current to the inductive transformers in the personal flight vehicle. The ground based energy broadcast tower system may provide point-to-point direct-line-of site mobility for one or more personal flight vehicles. A ground-based power distribution tower 1042 may pulsate DC power based upon Tesla theories. The ground-based power distribution tower 1042 may be made of a simple construction or specially constructed Magnetic Levitation towers.

The ground based power distribution towers 1042 may be located strategically along urban points to provide initial thrust enhancement to the personal flight vehicle, thus reducing the system weight. The ground based may also provide control lift points for the Federal-Air-Aviation air traffic control requirements. The ground based power distribution tower 1042 may contain a communication module 1072 to communicate with the navigation system onboard the personal flight vehicle to provide tracking of the personal flight vehicle as well as focusing power to a particular personal flight vehicle. A Global Positioning System 1073 may be incorporated into both the towers and the onboard the navigation system. The communication module 1072 may send a red light and sound an audible signal the user that they have wandered outside of prescribed flight lanes.

The ground-based towers use an induction broadcast power-supply based upon Tesla's power broadcast theory. The projected induction power from the ground based power distribution tower reduces the onboard power requirements of the personal flight vehicle. A ground based power distribution tower 1042 produces directed high-voltage, high-frequency, low-amperage power either directed at one or more personal flight vehicles in the range of the tower or in a limited general broadcast area. The ground based power distribution tower 1042 slowly lowers a personal flight vehicle to the ground if a user goes outside the prescribed air-lane due to the natural fall off of available energy when the user goes outside the area where the tower pulsates the energy.

Magnetic levitation launch towers could also be incorporated into emergency and tactical vehicles as collapsible towers. The energy broadcast towers could also be incorporated into emergency and tactical vehicles for fixed operating environment, rapid deployment situations.

Figure 11:
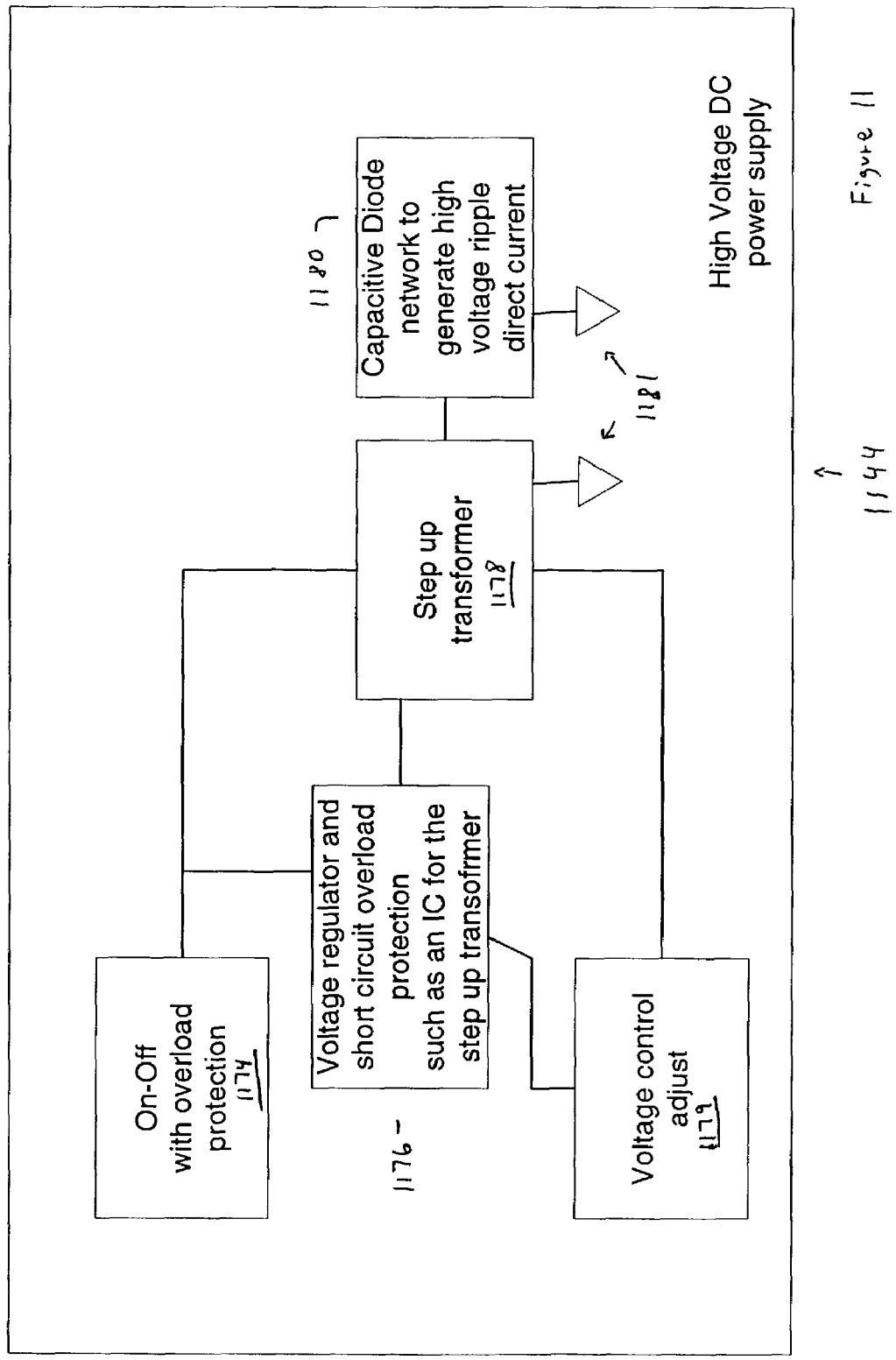
FIG. 11 illustrates an example high voltage pulsating DC power supply located inside a ground based power distribution tower.

FIG. 11 illustrates an example high voltage pulsating DC power supply located inside a ground based power distribution tower. The high voltage pulsating DC power supply 1144 may include components such as an On-Off control circuit 1174, Voltage regulator and short circuit overload protection circuit 1176 such as an IC for the step up transformer 1178, Voltage control adjust 1179, Step up transformer 1176, Capacitive Diode network 1180 to generate high voltage pulsating direct current, and a connection to circuit/Earth ground 1181. The On-Off control circuit 1174 with may also have overload protection such as a fuse or circuit breaker. The Voltage regulator and short circuit overload protection circuit 1176 provides voltage control for the step up transformer 1178 and thus the level of the voltage being pulsed to the personal flight vehicle. The Voltage regulator and short circuit overload protection circuit 1176 also provides short circuit protection and inductive feedback protection for the step up transformer 1178. In an embodiment the Voltage regulator and short circuit overload protection circuit 1176 may be an Integrated Circuit or System On a Chip. The capacitive-diode network 1180 rectifies and stores the voltage from the step up transformer 1178 to generate high voltage pulsating direct current broadcast from the tower. The circuit/Earth ground 1181 may act to complete the electrical circuit formed by the capacitive plates of the personal flight vehicle, the air, and the Earth.

In an embodiment, the Pulsed DC increases the efficiency of terst models by about 200%. The frequency at which the flyback operates enhances performance sapping back of an Electro Magnetic Field. As noted, the tower based energy projection system provides the High Voltage power solution and eliminates an onboard weight requirement for the personal flight vehicle 102.

The HV DC power-supply 1144 provides a pulsed DC voltage to the onboard inductive transformer stack. The onboard adaptive transformer stack, employs the earth's own resonance with its specific vibrational frequency to conduct pulsed DC electricity via a this series of towers acting as electric oscillators placed in strategic points in urban centers or on mobile units.

The towers may employ a variety of techniques to convert energy to high voltage DC power. For example, the towers may use existing AC power lines, fuel cell powered transformer based ground generators, etc.

Figure 12:
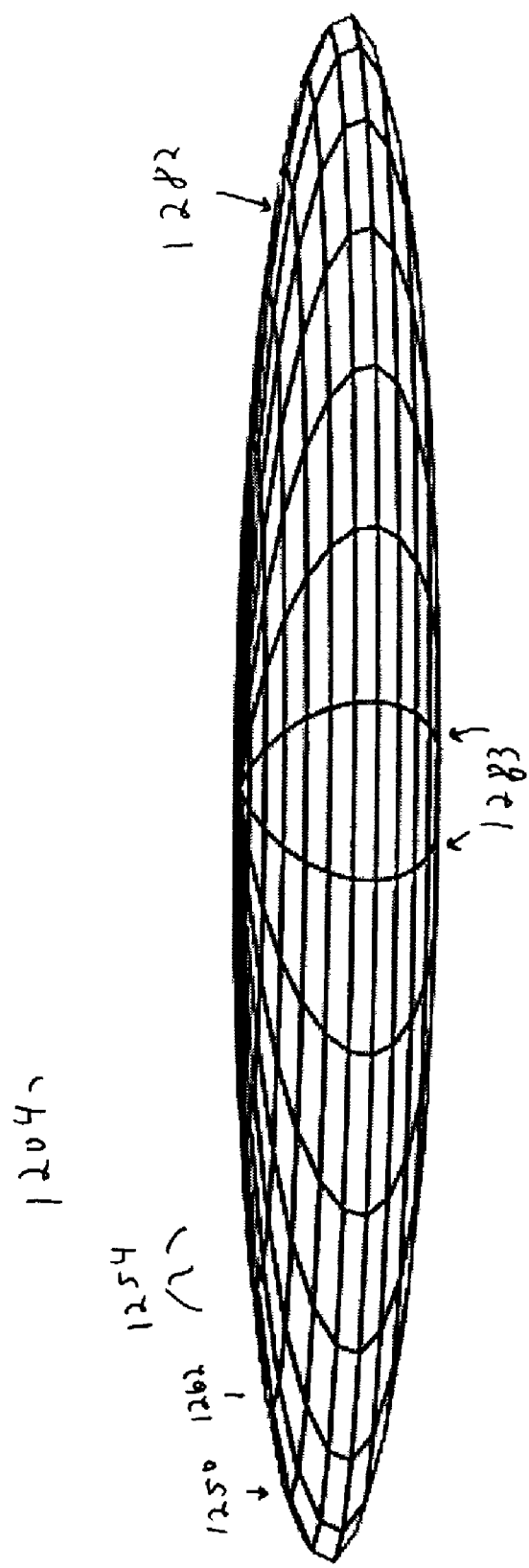
FIG. 12 illustrates a wire frame view of an embodiment of an electric-energy lifting panel.

FIG. 12 illustrates a wire frame view of an embodiment of an electric-energy lifting panel. As described above, a cross section of an embodiment of the electric-energy lifting panel 1204 may contain multiple sets of emitter wire layer 1262 and concentric ion plate arrays 1250 layered on top of each other. An overall disk shell 1282 may cover those layers 1250, 1262. Support struts 1283 may assist in maintaining or controlling the air gap between capacitive components. The support struts 1283 may also assist in maintaining a defined distance between each layered set of components. The electric-energy lifting panel 1204 may be collapsible along certain support struts 1283. The electric-energy lifting panel 1204 may be spring load and unfolds upon reaching launch apogee. The electric-energy lifting panel 1204 produces directional thrust using an electromagnetic propulsion system that has no moving parts.

Figure 13:
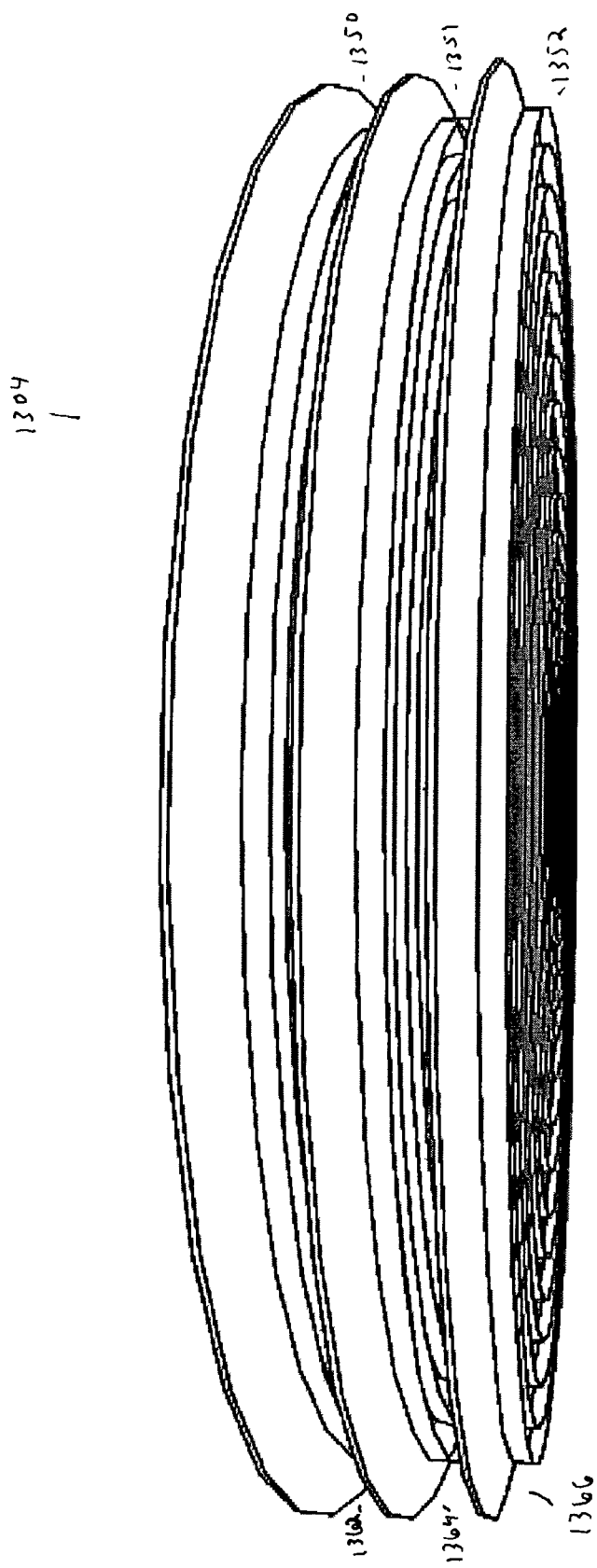
FIG. 13 illustrates an exploded view of a portion of an embodiment of an electric-energy lifting panel.

FIG. 13 illustrates an exploded view of a portion of an embodiment of an electric-energy lifting panel. The electric-energy lifting panel 1304 uses the Biefeld-Brown effect, an electromagnetic force exerted on a capacitor when it is charged with electricity. Even though all capacitors experience some type of internal force when charged with a high-voltage a capacitor utilizing capacitive plates of different geometric sizes creates a net-directional force when charged. Thus, by applying a pulsated high-voltage to a particularly designed capacitive module, the capacitive module creates a propulsive force.

Highly charged capacitors when properly suspended show a tendency to move relative to the gravitational force.

When the poles of a freely suspended charged capacitor (even in vacuum) were placed on a horizontal axis, a forward thrust would be produced which would move the capacitor in the direction of the positive pole. The direction of thrust would reverse in conjunction with a polarity change.

In prior experiments tests for propulsion were performed at high voltages of 300 kV and even Megavolts. Typically, between capacitive plates two opposite plates are being charged from zero to high voltage. Electrons leave the metal surface on the negative plate and are accelerated towards the positive plate. As the electron accelerates its speed increases steadily to very high values. In an embodiment, the emitter wire layers 1362, 1364, 1366 and ion plate arrays 1350, 1351, 1352 act as these capacitive plates. In an embodiment the Biefeld Brown effect may cause the effective electron mass to act as a real heavier mass. Applying Newton's laws may result in erroneous calculations because the Biefeld Brown effect deals with relativistic speeds within lifters. The higher the applied voltage to the capacitive components, the higher the input energy E=Vq, the less accurate may be calculations based upon Newton's theories.

Einstein's Space-Time warping theories can be more practically applied for the effective mass, total energy and actual particle speeds within a high voltage gradient field. Effective mass at relativistic speeds=$m/(1-v^2/c^2)^{1/2}$=$ym$. Total energy=$ymc^2$. Energy used during acceleration=$(y-1)mc^2$. 1 $mc^2$ is equivalent to the energy stored within the mass of particle at rest and is not part of the input energy.

Several explanations can be generated for the above equations.

1. The energy required to move stationary mass m at velocity v is equivalent to that moving a much higher effective mass at velocity v.

2. The energy required to move stationary mass m for a distance d is equivalent to that moving the same stationary mass m for a much longer effective distance than d.

3. The energy required to move stationary mass m for a distance d during time t is equivalent to that of moving the same stationary mass m for the same distance in a much shorter time.

4. The energy required to move stationary mass m at velocity v, is equivalent to the energy required to move the same mass at velocity v, plus an energy doing work against radiation pressure difference (vacuum mod/ether mod/space-time warp.) between the front and rear sides of the particle.

The apparent mass increase is all due to the energy going into the space fabric, and none of it actually increases the real mass of the particle. The mass increase (as shown by points 1, 2, 3, 4) is only a virtual description of the effect best described by point 4.

When a relativistic particle travels through the field gradient between the capacitive plates a space-time warping effect may occur in the space-time fabric. The greater the 'effective' mass or energy input, the greater the space-time warping effect. Thus, in an embodiment, the electric-energy lifting panel 1304 may produce its own a gravity field and thereby cause an anti-gravity effect. These particles with relativistic speeds undergo time dilation, that is when viewed from an external inertia reference frame, the particles seem to be going slower, and so energy from outside this frame seems to be going in for a longer time. Even if the effect might be very small, the speed of electrons in electric-energy lifting panel 1304 undergo time dilation, which indicates the occurrence of space-time warping. The same kind of space-time warping created by the Earth's gravity field. The higher the voltage, the greater the field, and the greater the deviation between the electric-energy lifting panel 1304 inertial reference frame to its ambient. The volume of air around the electric energy panel also undergoes mechanical inertia changes and electrical permeability changes.

Embodiments of the electric-energy lifting panel 1304 can still levitate inside a vacuum enclosure. While ion wind propulsion can work in space, it usually assumes that there is argon, krypton, or other noble gas to be used as the propellant. Yet embodiments of the electric-energy lifting panel 1304 may function in a vacuum enclosure with no such gas available for transport.

Figure 14:
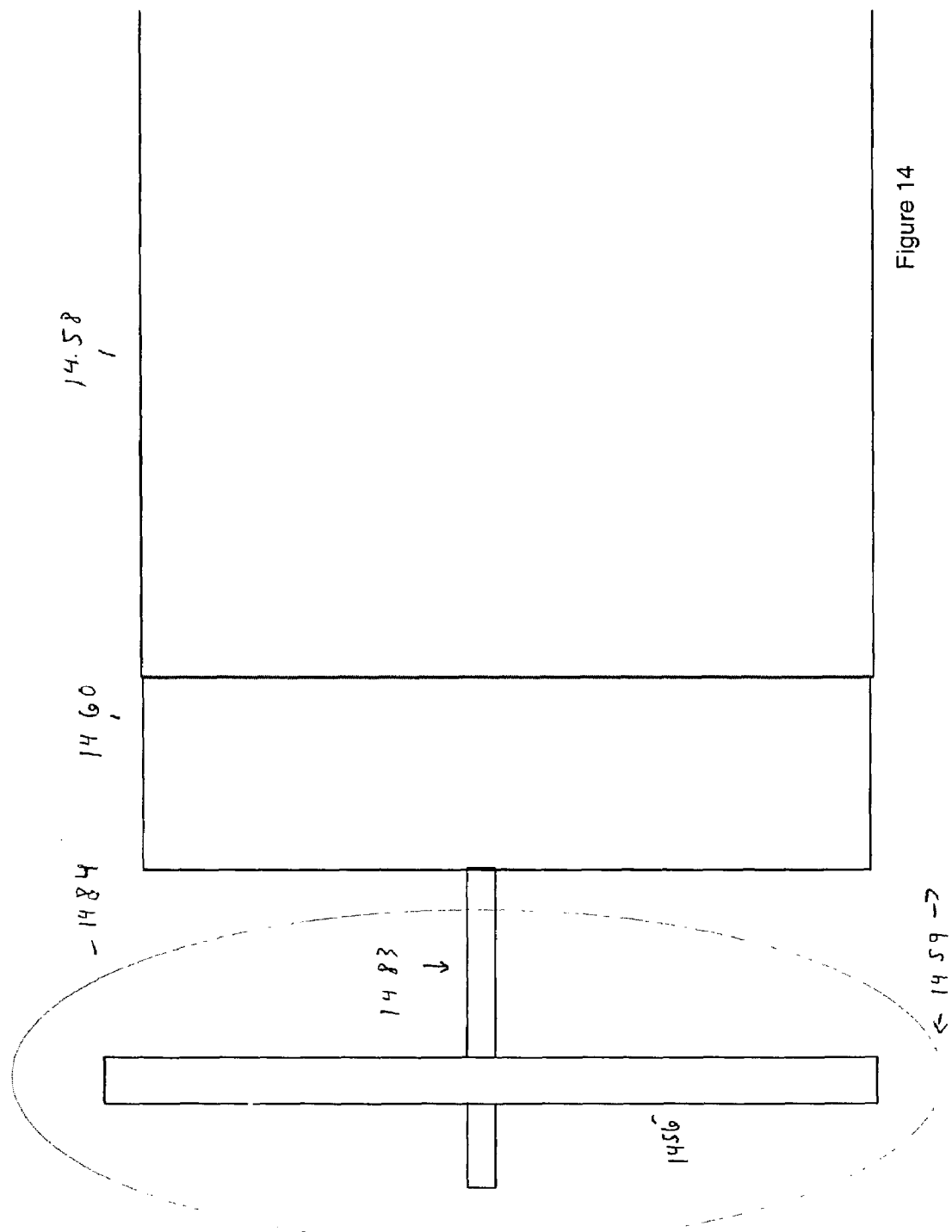
FIG. 14 illustrates front view an embodiment of the emitter wire air gap and ion plate relationship.

FIG. 14 illustrates front view an embodiment of the emitter wire air gap and ion plate relationship. As discussed above, the ion plate 1458 may have a bent over top edge 1460. The emitter wire 1456 may be a variety of geometric shape. The emitter wire 1456 generates a corona effect 1484 around the emitter wire 1456. The air gap 1459 generally has a define space but can be control by the control linkage. The air gap 1459 acts as a dielectric between the capacitive plates of the emitter wire 1456 and ion plate 1458. A support strut 1483 may maintain or control this air gap 1459 and thus dielectric effect of the air gap 1459.

Embodiments of the electric-energy lifting panel may change the dielectric material from the air-gap 1459 to another materials used to increase the dielectric capacity. High-K dielectric materials may be used to increase the displacement of electrons in the material to enhance charge transport. The increased dielectric potential of the layered materials also increases the breakdown resistance to allow thinner materials to be used. An embodiment of the electric-energy lifting panel without an air gap as the dielectric may accommodate lower voltage requirements between the ion plate 1458 and the emitter wire 1456. A given level of voltage must exist to create the Ion wind effect. However, the voltage may not have to create the very large e-field gradient, such as 50,000 v, to create a leakage current across such a large void. Therefore, the overall voltage across the device may be reduced, for the same amount of thrust. I In an embodiment, the electric-energy lifting panel may lift 3 pounds per horsepower. Thus an electric-energy lifting panel consuming 66 horsepower may lift 200 pounds of mass. A lower operating voltage in turn means that a lower-output power-supply can be used for a given amount of current, which increases the overall efficiency. The layered materials of the electric-energy lifting panel having a high-k dielectric material rather than an air-gap may also ease manufacture of the electric-energy lifting panel.

The high electric field between the capacitive plates may act to change the refractive index of the dielectric material. The dielectric constants may increase with refractive index for different materials. The dielectric constant, K, is equal to the sum of the real (E') and imaginary (E") permittivity of a material and is the square of the refractive index, or $K=n^2=c^2/v^2$. The effective mass increase factor y, may be related to the dielectric constant K of the dielectric as follows: $y=(1-v^2/c^2)-\frac{1}{2}$; $y=(1-K-1)-\frac{1}{2}$.

Thus, the effective increase in energy required to accelerate the particle at relativistic speeds may not be due to an increase in the real mass, but due to the changes undergone by the surrounding medium/dielectric properties. The extra energy involved is being used up to modify the dielectric constant within the dielectric material.

Dielectric materials store energy. Total energy in the accelerating system=$(y+1)mc^2$. Note the +1 $mc^2$ is equivalent to the energy stored within the mass of the moving particle and is not part of the input energy. Input energy=ymc², where m is the stationary mass, which is a constant. Input energy=(1−K−1)−½ mc². However, as speed gains up, input energy goes up, but the actual resulting acceleration may go down, until it zeroes at v=c. Thus the unaccounted for energy may be given out to the surrounding space. The unaccounted for energy may be stored within the dielectric (space, air, mica or whatever). A dielectric may be defined by its permittivity, and it is this value which can be expanded or compressed as the energy fills up this space.

Note that in the expression: Input energy=(1−K−1)−½ mc², the only variables are the energy and the dielectric 'constant' which is not constant at all. The dielectric constant K of a capacitor can change with temperature and frequency. The refractive index (n) varies with frequency (and K=n²). When energy is input into a device containing relativistic speed particles, its dielectric constant (and its refractive index) can change. Of course this will not be the 'relaxed' condition of the dielectric, and it will be in a stressed condition, until the internal energy is dissipated, and the dielectric gives back this energy and acquires back its normal permittivity. This process is very similar (actually the same) to the process of charging a capacitor.

A high voltage capacitor is thus changing its internal permittivity with electrical energy input, and thus may be modifying space-time within its plates. From the above discussion, it follows that a change in space-time is normally accompanied by a change in dielectric constant, a change in refractive index, a change in the properties of its inertia reference frame and a change in gravitational field within its plate. In fact, it is known that when an isotropic substance is placed in an electric field, a change in refractive index occurs, which is better known as the Kerr Effect. The effect is quadratic with respect to the electric field strength.

This supports the idea that a capacitor charged at high voltage will gain inertia, not because of its speed or mass, but because of the modified space-time within it. The highest gain in inertia or gravity field will be nearest to the positive plate where most particles would have accelerated to their maximum speeds a thus left the most stressed space-time. The situation can be explained as 'elastic potential energy within the space-time fabric' and this potential energy will be present as long as the capacitor stores the energy within its dielectric.

The thrust or lift generated by the electric-energy lifting plate can be higher in asymmetric capacitive electrode configuration. A mass or localized energy field within a highly energized dielectric within a symmetric electric field may not be subject to any external force, other than its own gravity field pointing towards the center of the mass in all directions. Under the Biefeld Brown effect, the thrust is higher in asymmetric electrode configuration. In a symmetric capacitor, the only asymmetry in its energy field is due to the fact that the motion of the electrons at the positive plate is at a higher kinetic energy than that of the electrons leaving the negative plate. This results in very small space-time curvature, with very small interaction with external energy points or masses, resulting in very small thrust. However, a larger space-time curvature occurs for an asymmetric electrode configuration. This asymmetric energy distribution causes generation of space-time elastic stress without the requirement of any particles flowing within the system. This would also explain the fact why a graded dielectric would amplify this elastic stress within such a field. The result of this space-time curvature on masses or energies within the frame (the B—B device) would be similar to a mass entering earth's gravity field. No particles are required to hit the subject, but the subject tends to be accelerated towards the slower time, i.e. the highest energy level. The greatest effect will be obvious on any matter within the field itself, but also on the walls within reach of the electric field force. In case of such a device operating in vacuum, with no mass or walls in the vicinity, the propulsion would be achieved by the space-time curve acting on the surrounding energy within the vacuum (vacuum energy, ether, etc.) which is abundant of high energy cosmic energy, the same energy causing gravity on any planet in the universe.

The Biefeld Brown effect generates elastic potential energy within the dielectric. Efficiency of this mechanism can reach near 100% if the elastic limit of the dielectric is reached on the positive electrode side. The elastic limit of all dielectrics is the same and equates to the condition v=c. Very high efficiencies such as 99% may be possible by using very high voltage to charge the capacitor. At such a limiting voltage we get:

Input energy=(1−K−1)−½ mc²=½ CV², where C is the capacitance and V=terminal voltage. Another formula for capacitance is:

$$C=(2\times(1-K-1)-½\ mc^2)/V^2.$$

The Biefeld Brown effect can correlate to the mass of dielectric as well as other conventional physics parameters making up capacitance. The above equation shows that at such high voltages, capacitance is related to dielectric mass as well. Both potential energy within the charged capacitor and Earth's gravitational potential energy may use the same mechanism. An embodiment of the electric-energy lifting panel use the electric energy in the capacitive plates to effect a gravity field. If the gradients of the electric-energy lifting panel gravity field and the Earth's gravity field are pointed against each other, then their elastic potential energies can do work against each other. Similar to pressing two springs together and releasing both. The lighter spring will move faster (our craft) as opposed to the 'Earth'. There may not be energy conversion in this process since they are both gravitational potential energies. This would imply that:

Electrical input energy=Input energy=(1−K1)−½mc²=½CV²=mgh, where h would be the change in altitude of the powered craft.

This method could eventually obtain efficiencies of over 99% for the conversion of electrical to kinetic energy within any dielectric medium including space. Under a theoretical basis, the craft's maximum speed may not be limited by the ion drift velocity but only by the speed of light.

Corona discharge 1484 (ion current flow) starts earlier then visible corona can be seen. Detailed tests about corona formation were made by Peek in the beginning of last century. Based on his tests he came up with an equation known as Peek's for corona onset voltage. An embodiment of the personal flight vehicle can use these equations in calculating thrust/voltage dependence:

$$V0=g0*r*ln(d/r) \text{ where } g0=30*kV/cm*delta*(1+0.301/sqrt(delta*r));$$

where r is radius of corona-wire in cm, d distance between wires and delta is a factor depending on air pressure and temperature as delta=3.92b/(273+t); where b is pressure in cm of barometric pressure and t is temperature in degree C.

For example, at d=30 mm and r=0.5 mm, an embodiment of the personal flight vehicle gets V0=14.4 kV, but with 50 gauge wire (0.01275 mm) the emitter wire gets V0 of 2.7 kV. So when the personal flight vehicle uses thin corona wire, the personal flight vehicle may get useable thrust at 10 kV.

Figure 15:
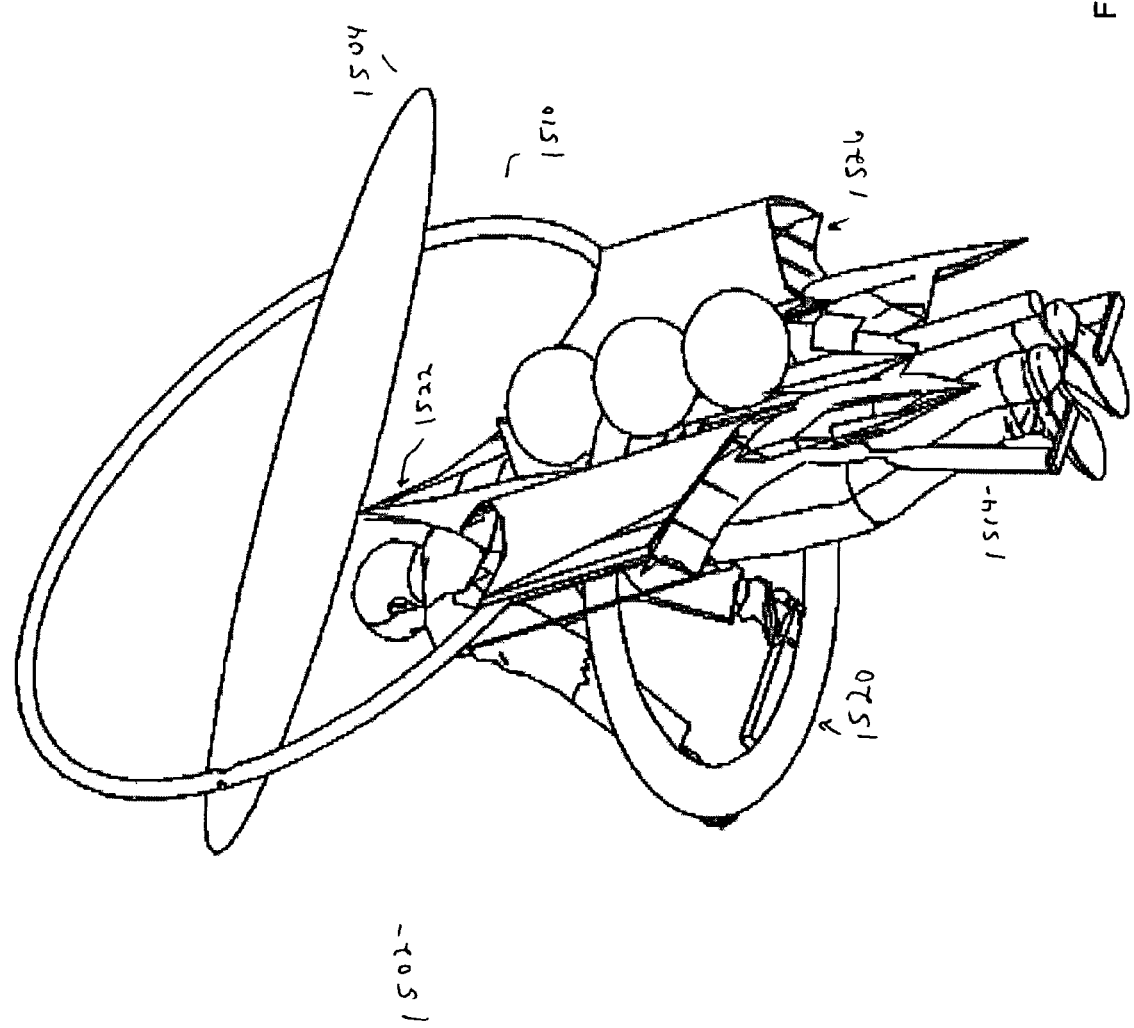
FIG. 15 illustrates an embodiment of an electric-energy lifting panel.

FIG. 15 illustrates an embodiment of an electric-energy lifting panel. A spark gap may produce propulsive capabilities. The ion conditioner 1522, such as a laser, can enhance ion conduction of the air. The ion conditioner 1522 acts to increase the amount of conduction current in an ion processing effect propulsion system without increasing the power-consumption. The magnitude of voltage still must be high-enough to create the ion wind conduction current in the first place; however, the ion conditioner 1522 can lower the minimum conduction voltage. Similar to the high K dielectric, the ion conditioner 1522 can lower the operational voltage used in the personal flight vehicle 1502. High voltage ion-wind involves voltages that are enough to cause ionization in the first place. Efficiency curves for ion wind tend to start at the part of the curve where ion-wind begins at around 20,000 volts. If you can visualize a voltage to thrust curve, the curve would start out high and become lower as voltage increases. In other words, you may gain 1 watt's worth of thrust by doubling the voltage, but it costs you 2 watt's worth of input power to achieve one watt of ion wind. Traditionally, most scientists do not try to experiment further up the curve to the part where a high-efficiency exists because air does not typically conduct electricity at those frequencies. However, the ion conditioner 1522 can assist the personal flight vehicle 1502 to operate in these regions of higher efficiency.

The volume of electricity seems to enhance propulsion more than the speed of the electricity (current versus voltage). While increasing voltage does have a positive effect on propulsion, the trade-off in terms of power required to step up to the voltage may not make up for the increased power consumption.

Several ways exist to ion enhance the air envelope around the personal flight vehicle 1502, such as UV bulbs, Lasers, and Microwave-Excitation of the air. Ion enhancing the air envelope can increase the conductance of the air gap. Because the air-gap is a dielectric and the ion enhancement forces more ions through it, a higher-voltage is going to cause a greater number of them than a low voltage. In contrast to typical ion-wind theory, under one ion-wind theory, the volume of current does more work than the voltage that it travels at. The only requirement is that the voltage is high enough to conduct through the air gap. The volume of ions is doing most of the work, not the ions' speed. The ion conditioner 1522 increases the volume of ions as well as lowers the required voltage to stimulate ion wind.

Traditional Ion processing experimenters have indicated that experimentally, 40 kilovolts appears to provide a great deal of thrust compared to 30 kv, however, this is not mathematically supported, and is believed to result from increased conductivity of the atmospheric medium. In other words, since the air essentially functions as a semi-permeable dielectric, the increased voltage has a greatly pronounced effect on conduction-current transfer through the air, which bears the resemblance of being more powerful when in reality it is simply more efficient than the lower voltage.

Extrapolation into low-voltage behavior from previous equations, which were designed for high-voltage research, shows that lowering the voltage to levels considerably below those thought to be possible allows a much greater increase in efficiency than previously thought. Using Saviour's equations, a baseline voltage of 30 kv from an example emitter wire to ion collector plate could produce a performance of 1 g/Watt, and an ion-transport speed of 1.72 $cm^2$/Vsec. Having established a baseline to compare against, when the value of 115 volts rectified to DC is used instead of 30,000 volts. The overall performance changes to 324.6 g/Watt, which is equivalent to nearly 1 pound per watt, or about 746 pounds per horsepower. Further, adverse X-ray and ionic effect are reduced as the voltage field gradient is lowered.

Ultraviolet photo-ionization occurs at the frequencies of, for example, 1024 nm for $O_2$ and 798 nm for $N_2$, both of these atmospheric air molecules will photo-ionize. Thus, these molecules found in air will then become ready for manipulation by electrical fields in the same manner that similar molecules ionize by high-voltage.

An Excimer-laser can stimulate the air-molecules within the beam radius to become conductive. The conductivity of a lightning channel or any atmospheric plasma—is in fact greater than the conductivity of an equal volume of copper wire. Thus, it is possible to manipulate and direct low-voltage currents of electricity through the atmosphere in the same manner that they are directed through a circuit board by using the appropriate wavelengths of ultraviolet radiation. The ion conditioner 1522 stimulates ion-production and conduction-charge transfer to modify the conductivity properties of air. So, instead of using 30 kilovolts of electricity to stimulate ion-production and conduction-charge transfer, a much greater amount of electricity can be transferred at a much lower voltage, such as 115 volts DC, without the side-effects associated with the traditional Ion processing and Ion-Wind technologies. Further, lower-voltages in Ion processing atmospheric conduction apparatus reduce overall power levels, output heat, and component failure rate.

Figure 16:
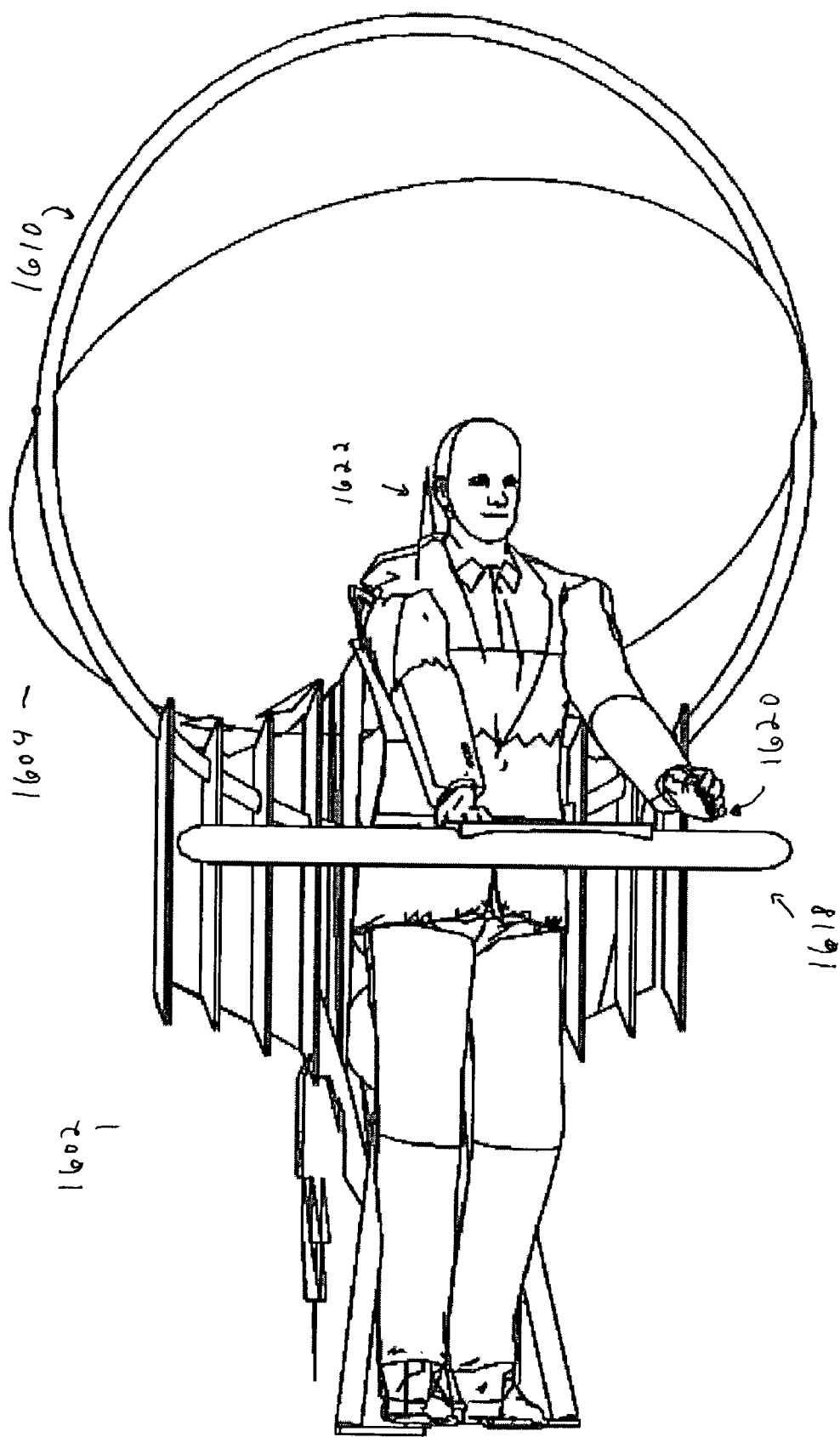
FIG. 16 illustrates an embodiment of the personal flight vehicle using a laser as an ion conditioner.

FIG. 16 illustrates an embodiment of the personal flight vehicle using a laser as an ion conditioner. A laser 1622 creates and steps up the ion field in the air around and between the capacitive plates inside the electric-energy lifting panel 1604. A nitrogen based laser, such as an Excimer laser, that ionizes the atmosphere could be used to reduce the required voltages for useable thrust to, for example, 125 volts. One watt of electricity stepped up to 10,000 volts may not be efficient. Pre-ionizing the operational air around the Personal Flight Vehicle 1604 provides efficiencies of energy. Ultraviolet light can be used to enhance the conductivity of the atmosphere, which can then conduct electricity at otherwise non-ionizing potentials. For example, after laser ion amplification and broadcast by a 193 nm ArF excimer laser, 115 volts may generate up to 2800+ grams/watt. Transmitting ions down a laser beam may have one drawback, which is it is difficult to get as much "lifting area" as with the wire-foil combination. Lasers 1622 such as UV-laser diodes, Nitrogen lasers, or CO2 lasers may be used to ion enhance the air. The laser 1622 may be combined with a targeting component to direct such a laser pre-ionizer or ionization amplifier.

In an embodiment, a different approach could involve the use of a short-wavelength UV laser pulse (248 nm) from the ground tower. The short-wavelength UV laser pulse produces a line of photoelectrons between the Personal flight vehicle 1602 and ground. The density of the photoelectrons created by direct three- or four-photon ionization is controlled by the peak intensity of the UV pulse. By contrast, in the case of the CO2 laser, the high field of the laser may lead to an uncontrollable electron-avalanche process. A distinct advantage of the shorter wavelength UV laser pulse is generating plasma having the reduced diffraction. The aperture of the short-wavelength beam on the ground could be at least 40 times less than that needed for a CO2 laser beam.

Three steps occur in the process of using a UV femtosecond pulse to create an ionized air channel. First, the pulse is propagated through the atmosphere to generate photoelectrons. Then, these electrons migrate and multiply in the electric field and induce a local electrical-field enhancement and electron avalanche. This avalanche leads to a completely ionized front or "streamer", moving at speeds up to one-third the speed of light.

The temporal and spatial focusing of femtosecond pulses at a wavelength of for example, 248 nm, can be used to create a narrow elongated needle of photoelectrons in the atmosphere. Two properties of air are particularly interesting at that wavelength. First, the ionizations of cross-sections of oxygen (three-photon) and nitrogen (four-photon) are particularly large, so that less than 50 mJ is required to obtain the minimum photoelectron density of 5×10 to the 11th e-/cm squared to initiate a lightning discharge. Second, the wavelength dependence of the index of refraction of air can be used for compression of properly pre-chirped pulses.

Ionizing a column through the air is only the first step. The ionized electrons remain for a few nanoseconds, before attaching to oxygen to form O2 and O-ions. Due to their low mobility, the conductibility of the ionized path is drastically reduced with the substitution of these ions to the electrons. This problem can be solved easily by sending a "photo-detaching" laser beam along the same path as the UV laser. A 0.2-mJ optical-pulse energy at one-half the self-breakdown voltage could be one of the smaller energies used to stimulate the effect. Such a system consists of a Ti: sapphire laser, a negative-dispersion line, a regenerative preamplifier, a large aperture amplifier, and a frequency-tripling assembly.

In an embodiment, the navigation system 1620 mounted on the flip and lock dashboard 1618 may include a control electro-mechanical system. The control electromechanical system coordinates with the tortuous pivot frame 1610 to control the pivoting of the electric-energy lifting panel 1604. The navigation system 1620 may also include a HITS GPS system which tracks the induction stream beamed from the ground based power distribution towers to keep a user on the air-roads. The GPS system relays positioning information and generates a red light and audible signal the operator that a user has wandered outside of prescribed flight lanes.

Figure 17:
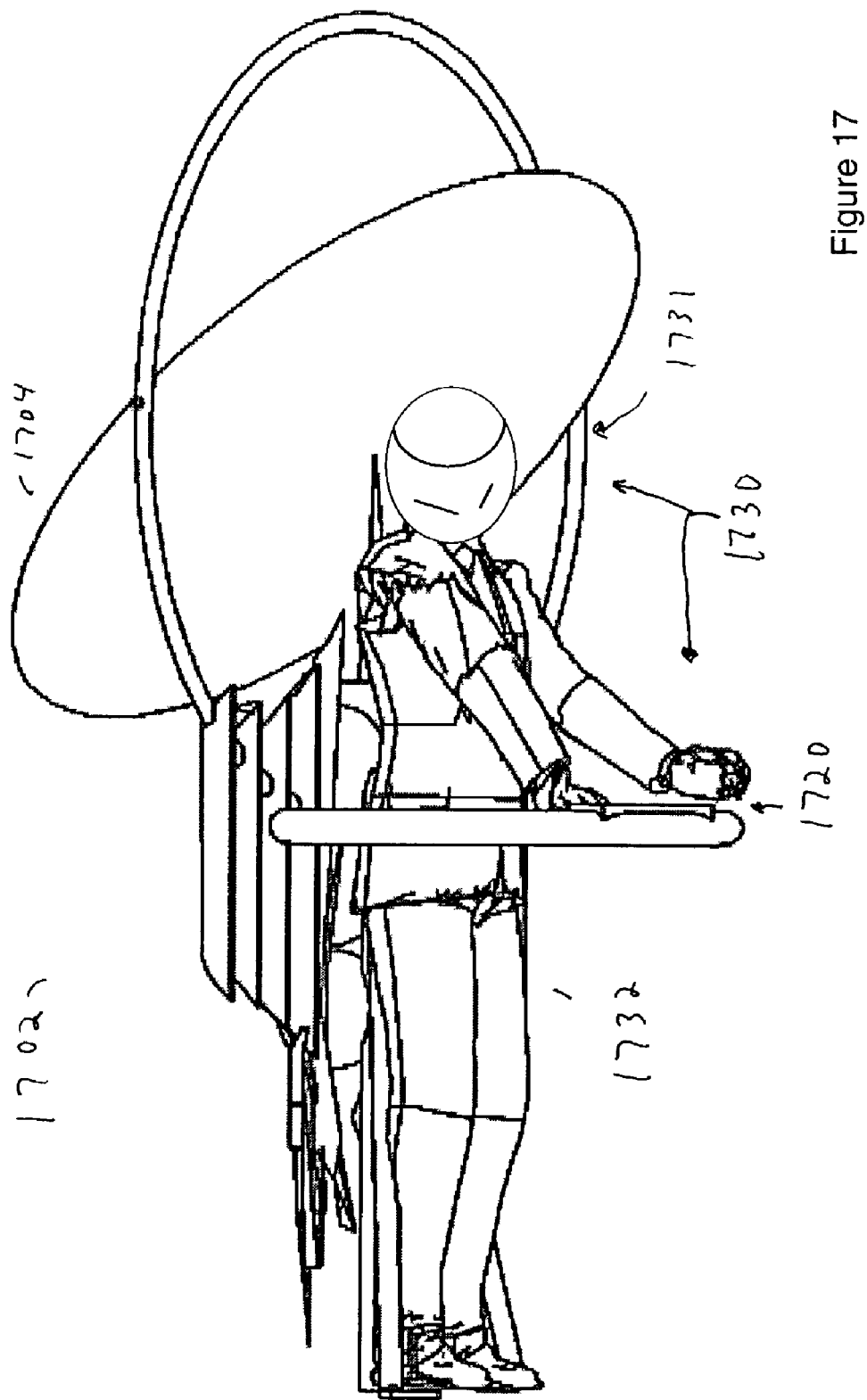
FIG. 17 illustrates an embodiment of the personal flight vehicle having the flight situation display system.

FIG. 17 illustrates an embodiment of the personal flight vehicle having the flight situation display system. The global positioning system navigation system 1720 may send and receive data from the flight situation display system 1730. The flight situation display system 1730 may be ergonomically designed. The flight situation display system 1730 replaces the old-fashioned instrument panel per the NASA Advanced General Aviation Transportation Experiment (AGATE) cockpit revolution. The display system 1730 is the foundation for NASA's Highway in the Sky (HITS) initiative, which is developing affordable glass cockpits for single-engine, single-pilot airplanes by the year 2001. The HITS display projects a pre-planned course "highway" for the pilot to follow, instead of gauges and dials for the pilot to interpret and synthesize into a mental picture of the airplane situation. The graphical display system 1730 includes a two-panel display of Global Positioning System (GPS) position and attitude, course, weather depiction, and aircraft track and performance. The integrated flight display system 1730 provides the pilot with an intuitive pictorial for situational awareness, and with a system that is affordable for a wide spectrum of general aviation aircraft. The pilot will use the highway display to guide and control the airplane intuitively.

In an embodiment, the frame the personal flight vehicle 1702 and the electric-energy lifting panel 1704 may be of composite structure, Graphites, bonded laminates and or similar materials. The electric-energy lifting panel 1704, flight suit 1732, and helmet 1731 contain Electro Magnetic Field shielding.

Figure 18:
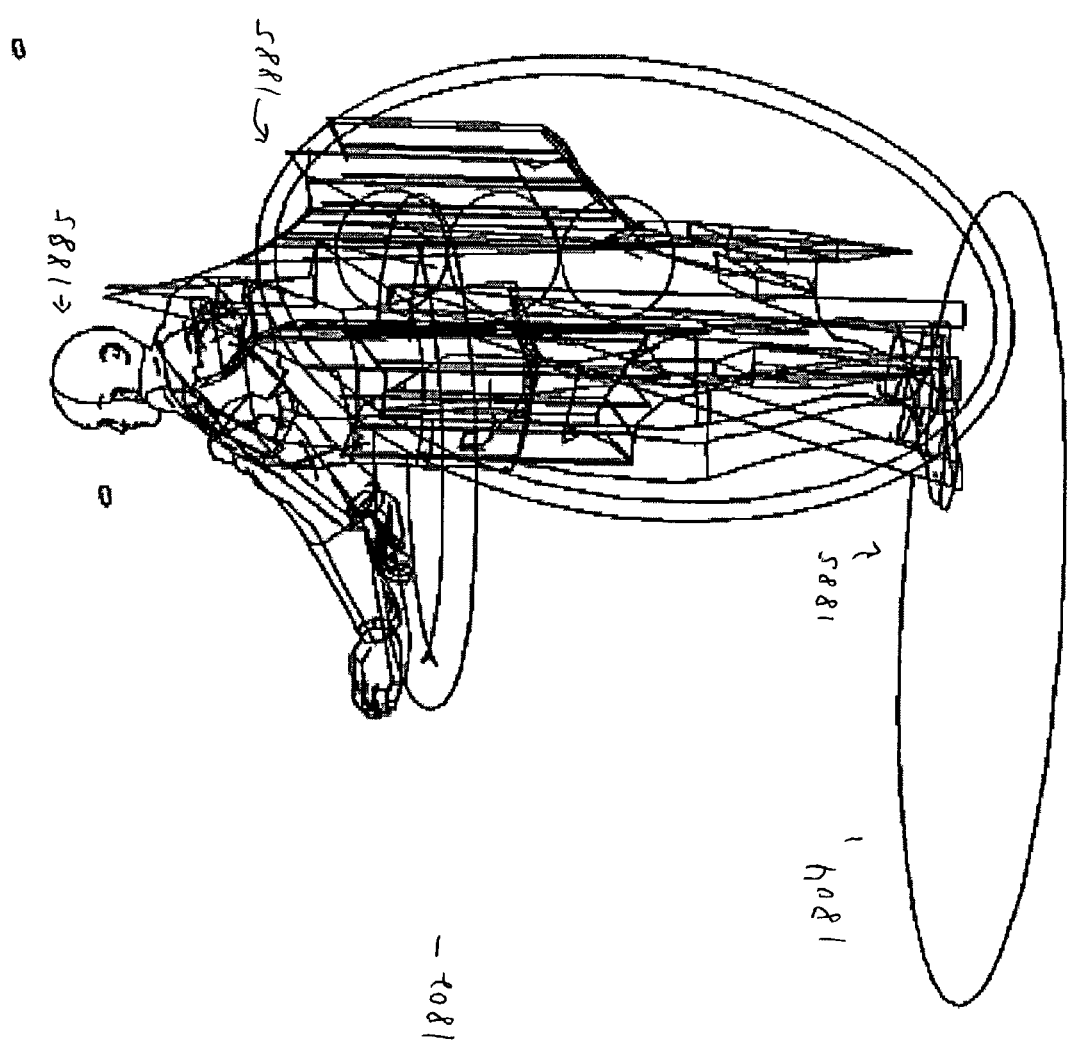
FIG. 18 illustrates an embodiment of the personal flight vehicle having an electric-energy lifting panel located under the user.

FIG. 18 illustrates an embodiment of the personal flight vehicle having an electric-energy lifting panel located under the user. An embodiment of the personal flight vehicle 1802 may have an electric-energy lifting panel 1804 located under the user. In an embodiment, the personal flight vehicle 1802 may produce ozone gas to help fill the Earth's disappearing ozone layer. The production of Ozone is a by-product of the kinetic interaction of electricity of sufficient voltage levels with air-molecules. In embodiments that use higher voltages, the increase in ion conduction reduces ozone production compared to the same voltages without increased ion conduction. Further, in embodiments that use higher voltages, added shielding 1885 reduces electromagnetic-interference between the personal flight vehicle 1802 and nearby electrical-equipment.

The pitch, roll and yaw process may be accomplished by either, varying energy to sections of the energy plate or triggering compressed hydrogen gas bursts through thrusters on the backpack or triggering hydrogen thruster gas combustion through thrusters on the back pack or via a small electric fan mounted on the back pack which can be directed via cables or servo motors. A joystick which can be plugged into the waist yoke at a connector on either the right, left or center of the yoke may be the main control mechanism.

Figure 19:
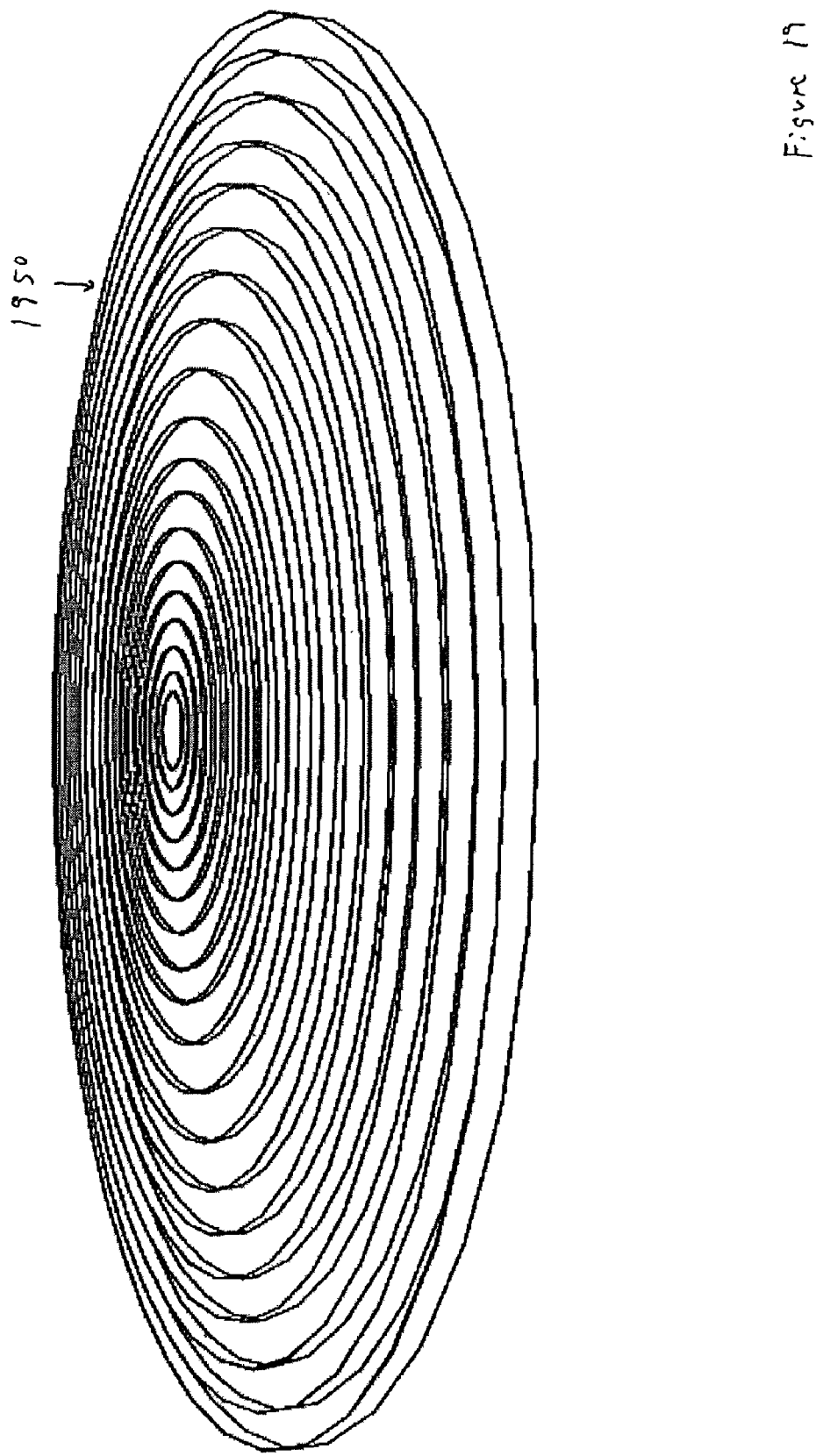
FIG. 19 illustrates an embodiment of a single layer of concentric rings of an ion plate array.

FIG. 19 illustrates an embodiment of a single layer of concentric rings of an ion plate array. Each ion plate 1950 may be formed in a concentric ring or a different shape.

Figure 21:
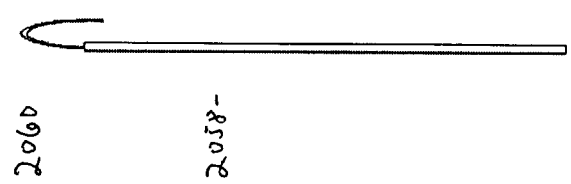
FIG. 20 and FIG. 21 illustrate an embodiment of a single ion plate bent over at the top edge of the plate.
Figure 20:
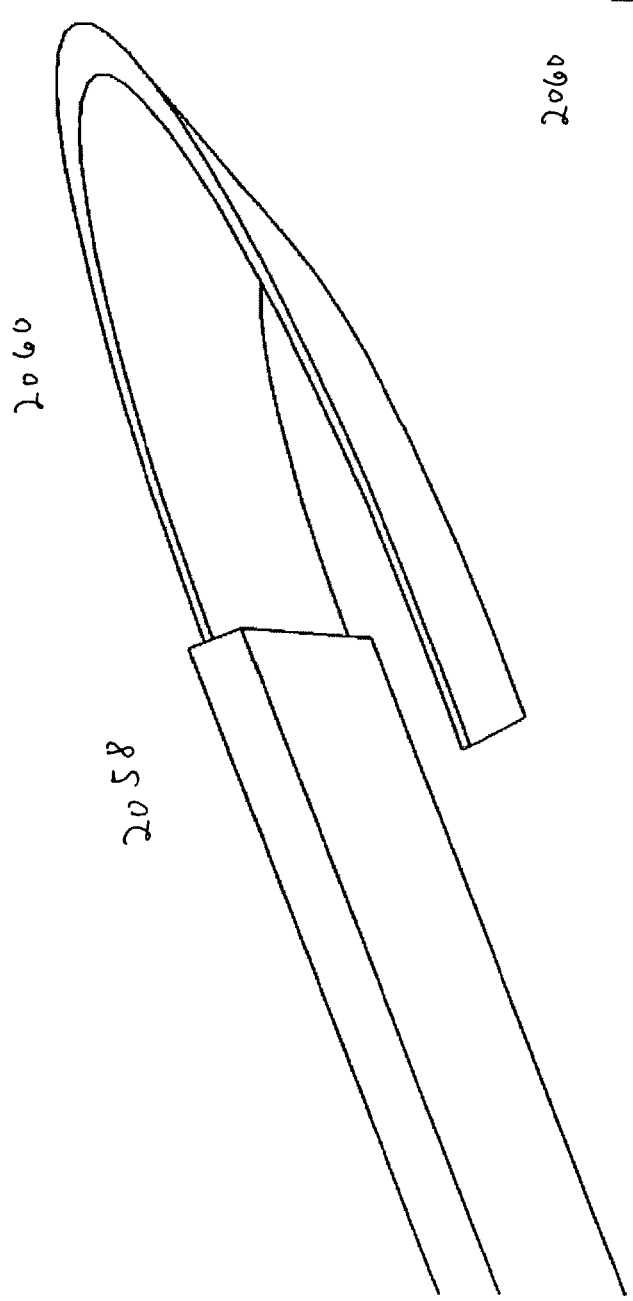

FIG. 20 and FIG. 21 illustrate an embodiment of a single ion plate bent over at the top edge of the plate. As discussed, an ion plate 2058 bent over at the top edge of the plate 2060. In an embodiment, the ion plate collector-voltage is set below the ground-voltage level of the environment to reduce static charge build up.

Figure 22:
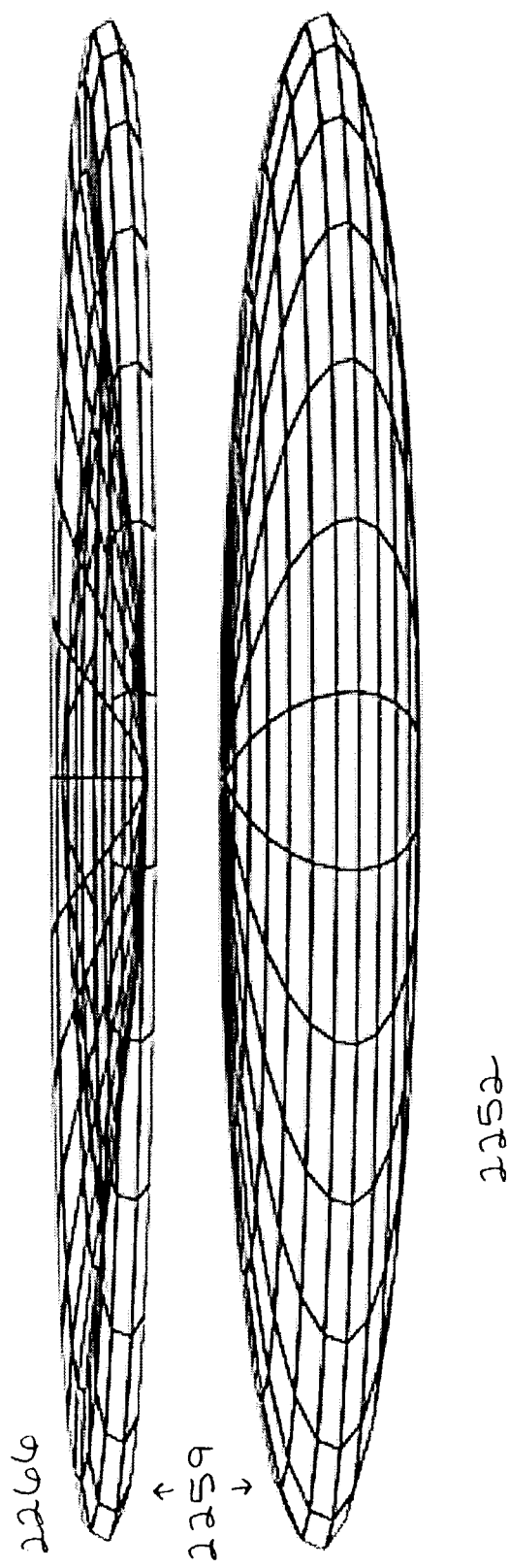
FIG. 22 illustrates an embodiment of a portion of the electric-energy lifting panel changing the air gap between the emitter wire layer and ion plate array.
Figure 23:
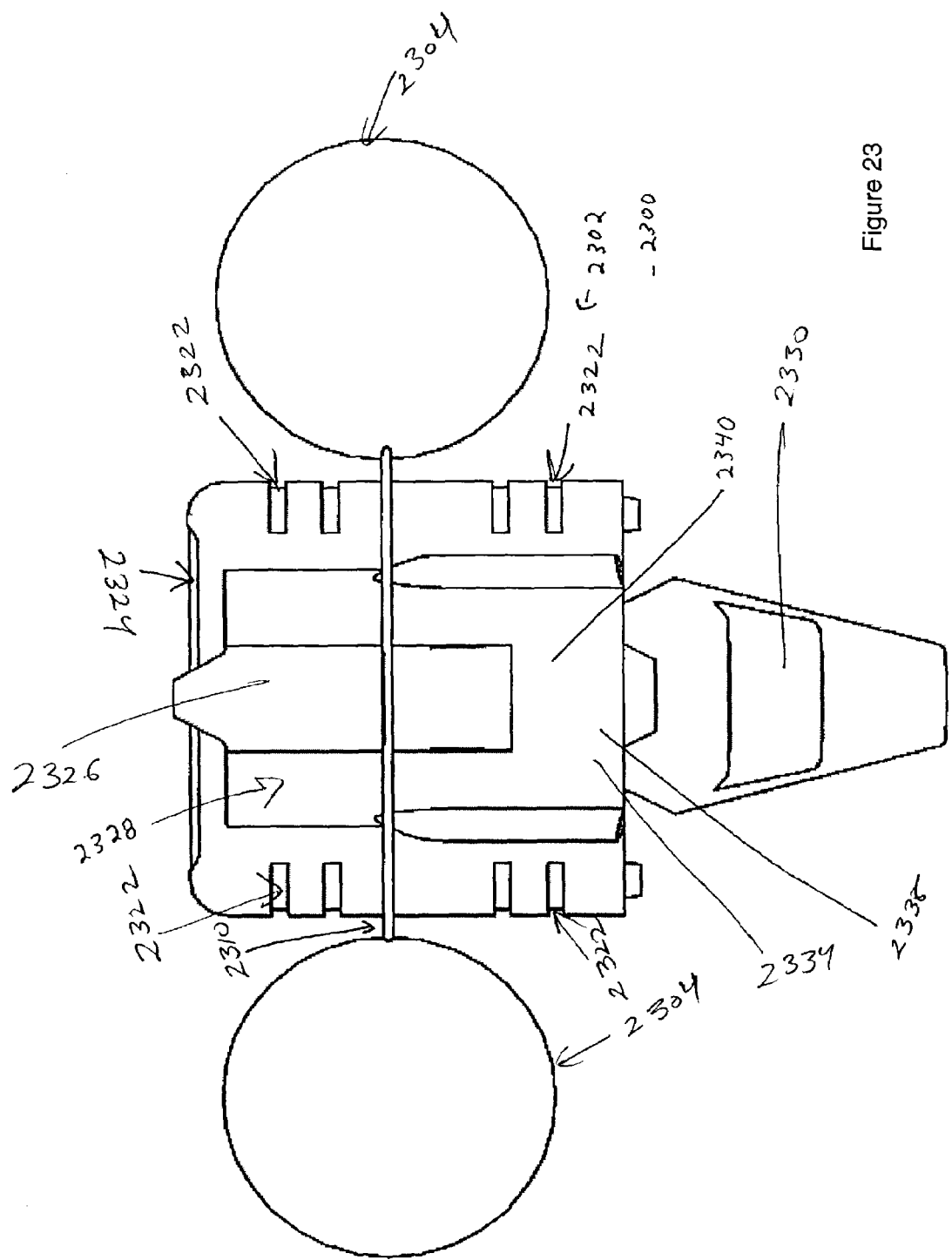
FIGS. 23–28 illustrate various views of an embodiment of a personal flight vehicle.
Figure 24:
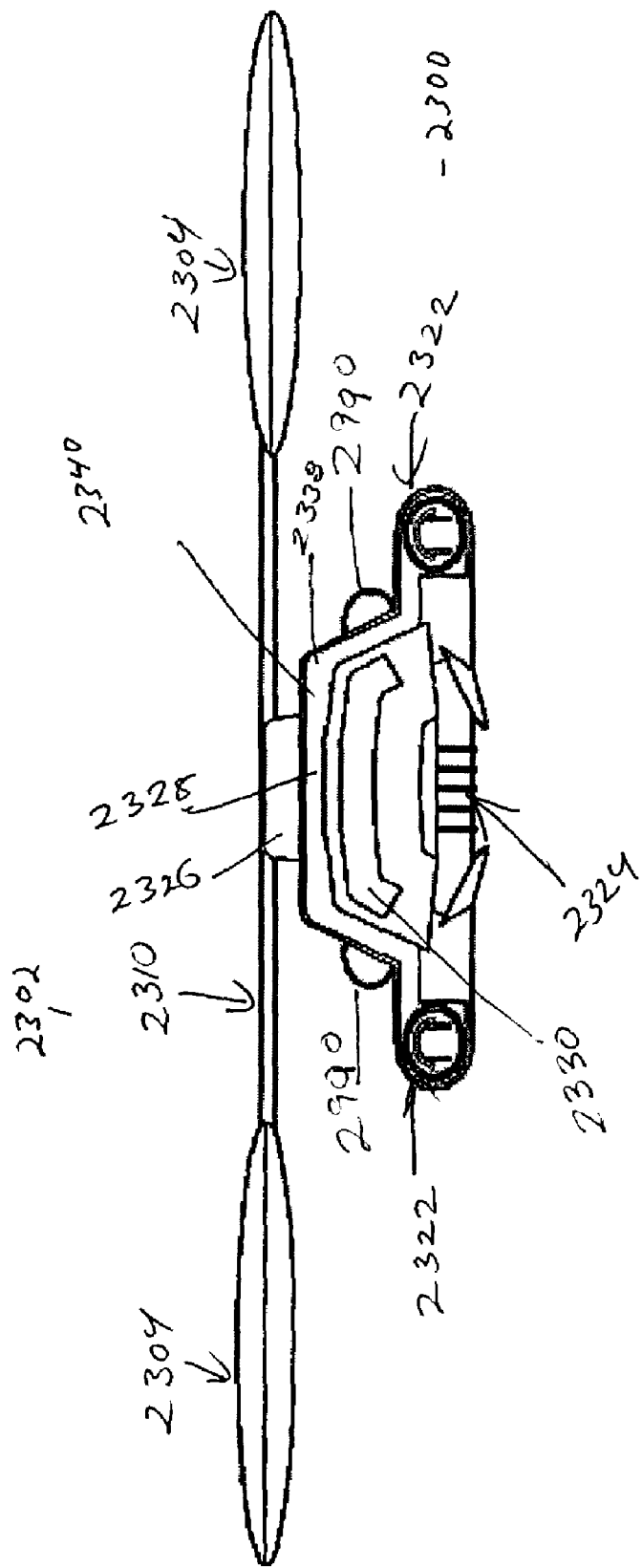
Figure 25:
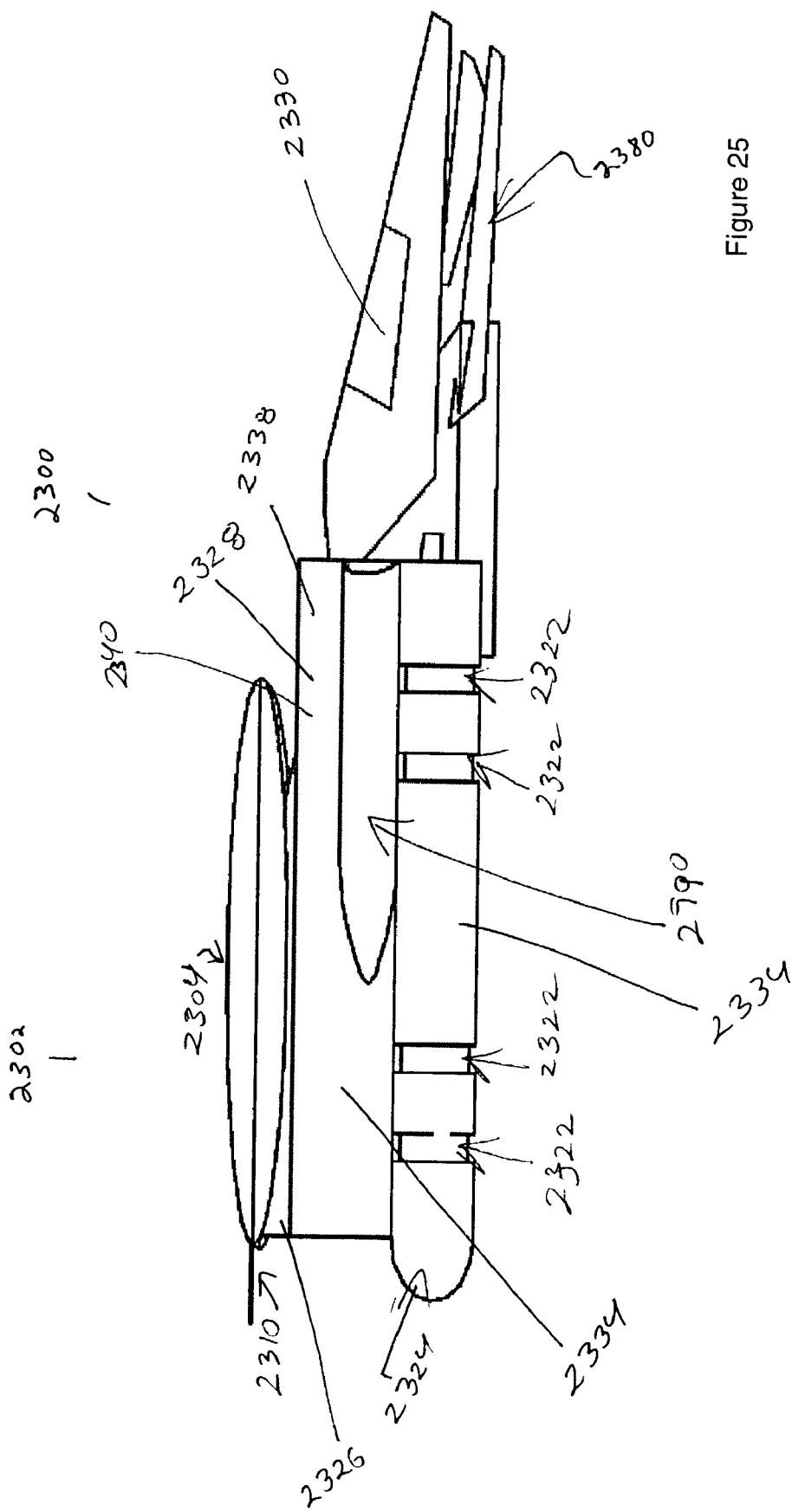
Figure 26:
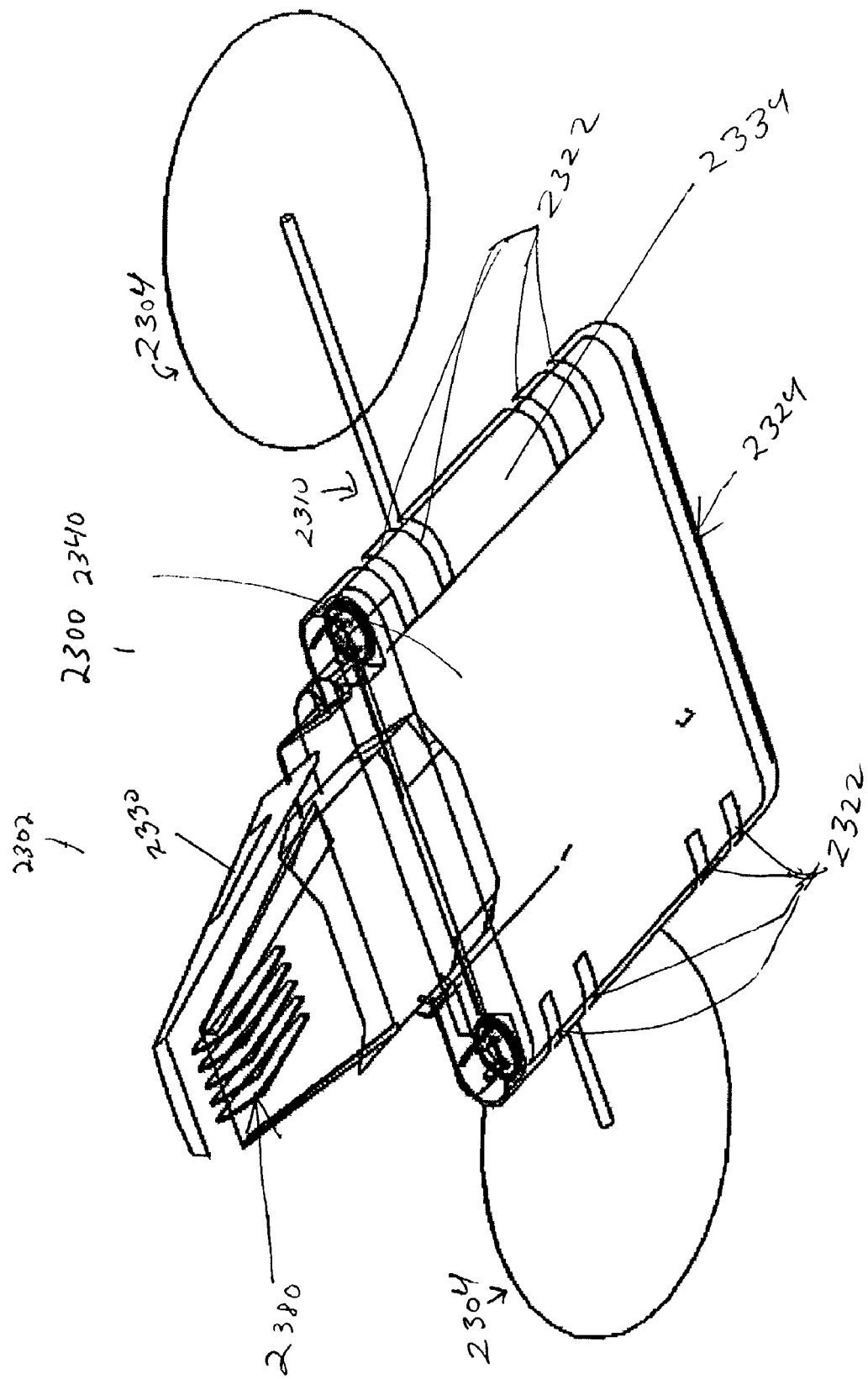
Figure 27:
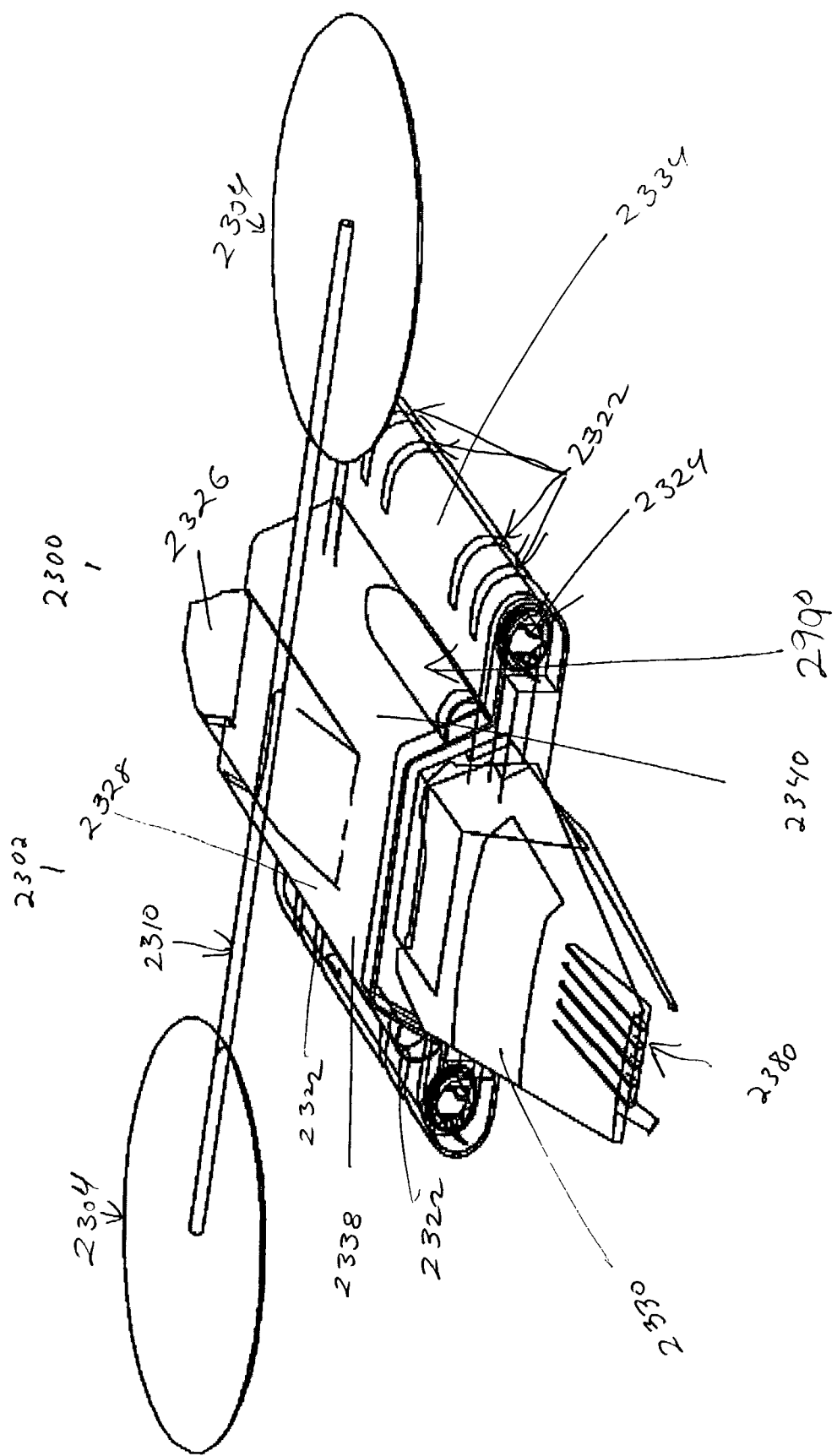
Figure 28:
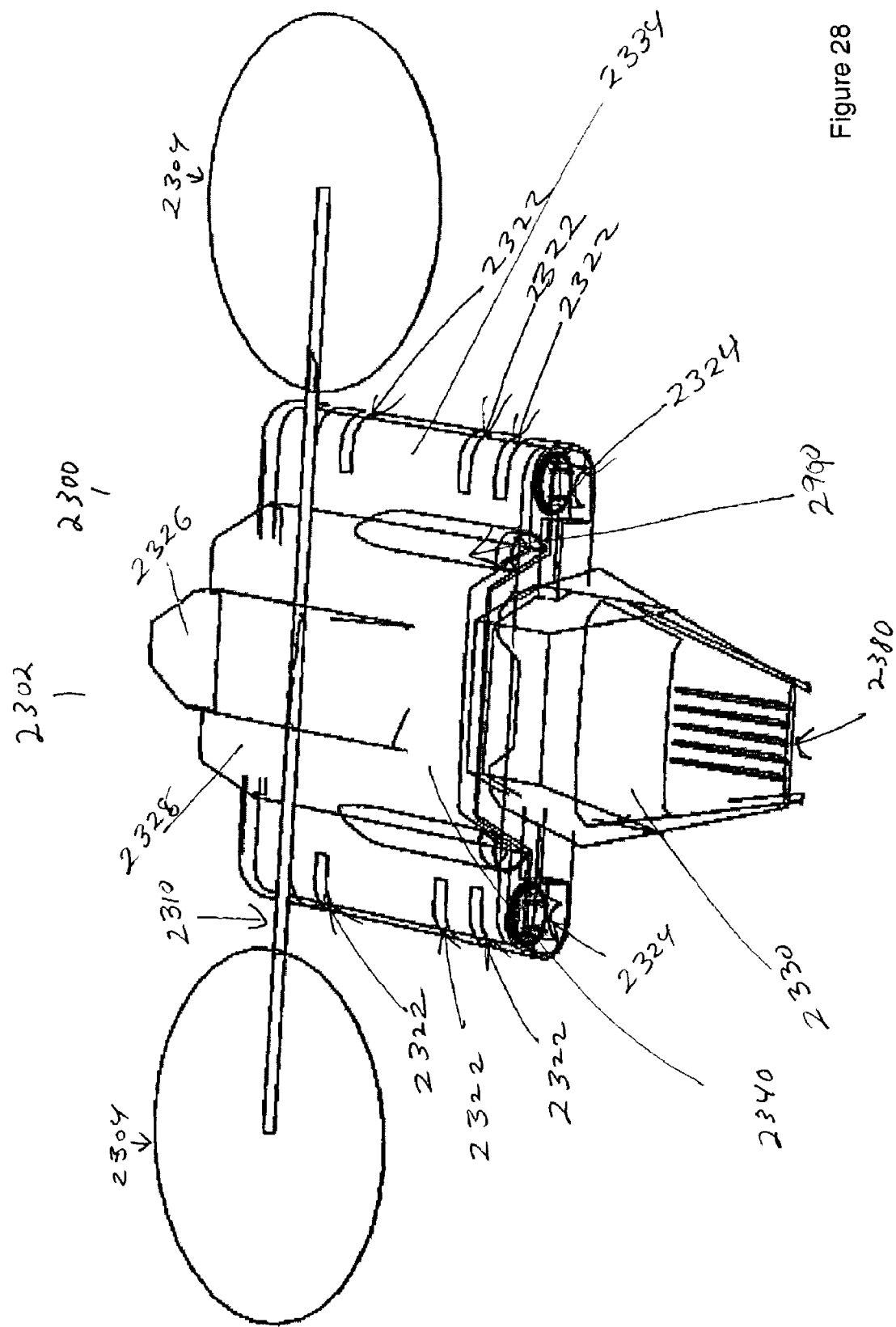
Figure 29:
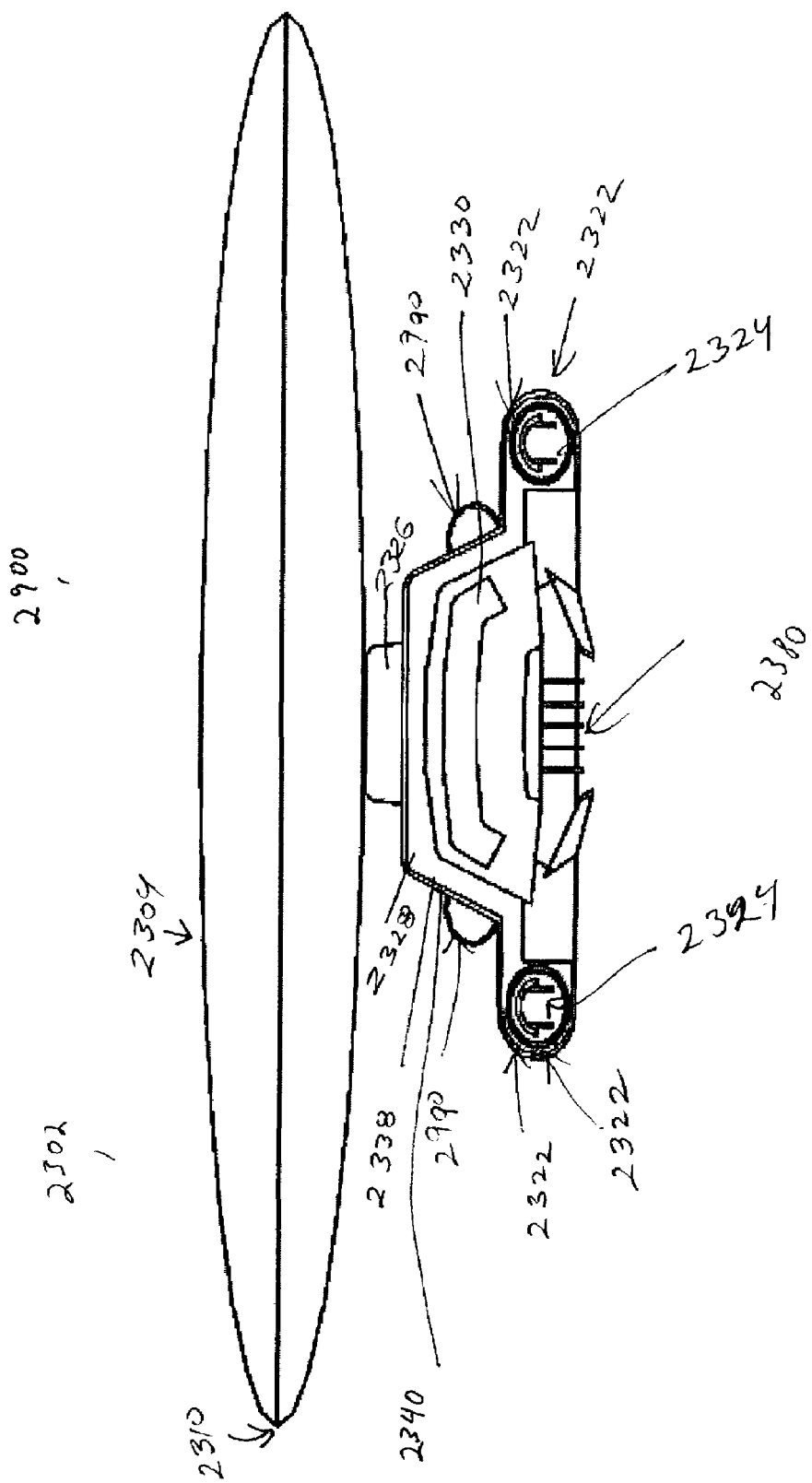
FIGS. 29–33 illustrate various views of an embodiment of a personal flight vehicle.
Figure 30:
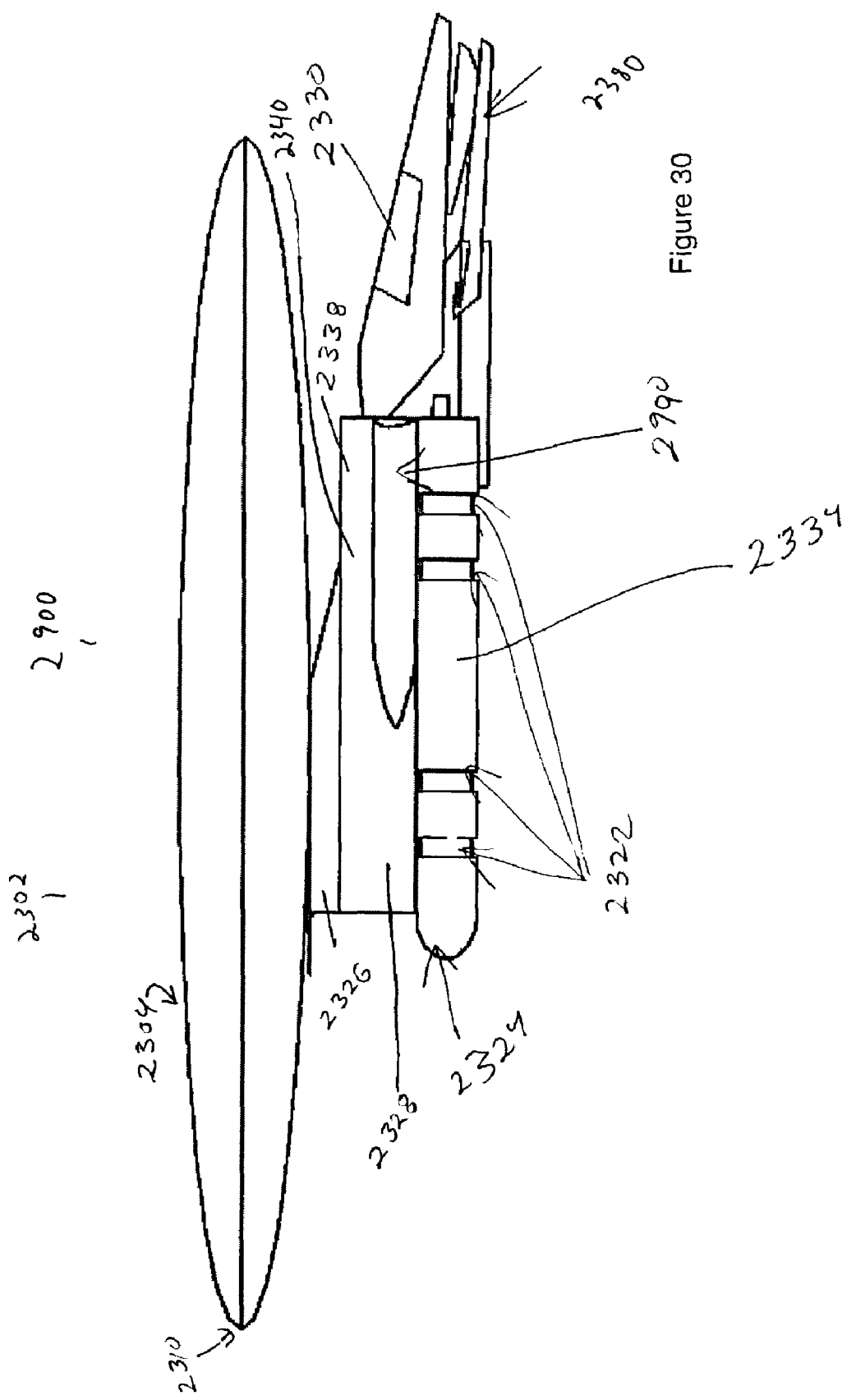
Figure 31:
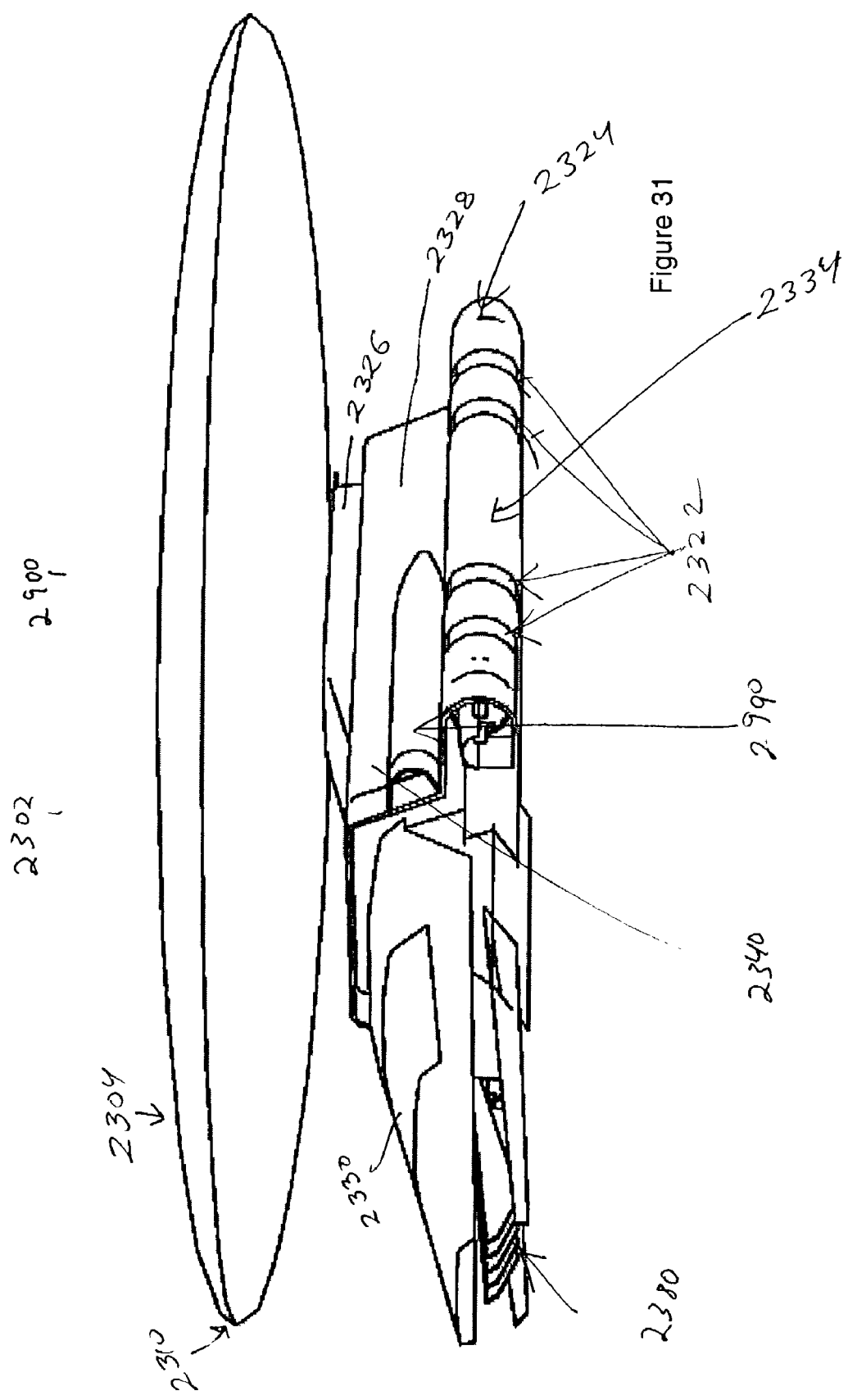
Figure 32:
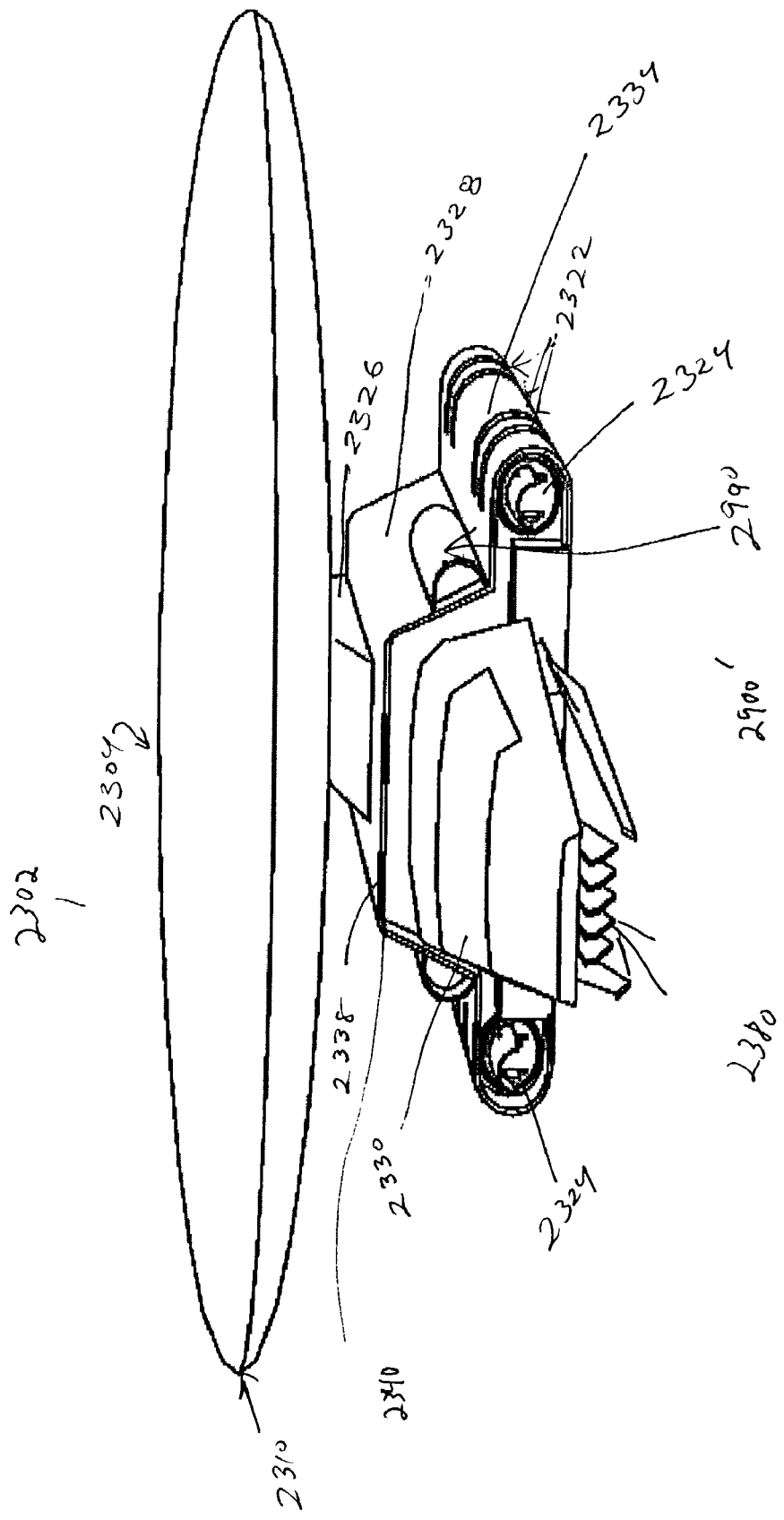
Figure 33:
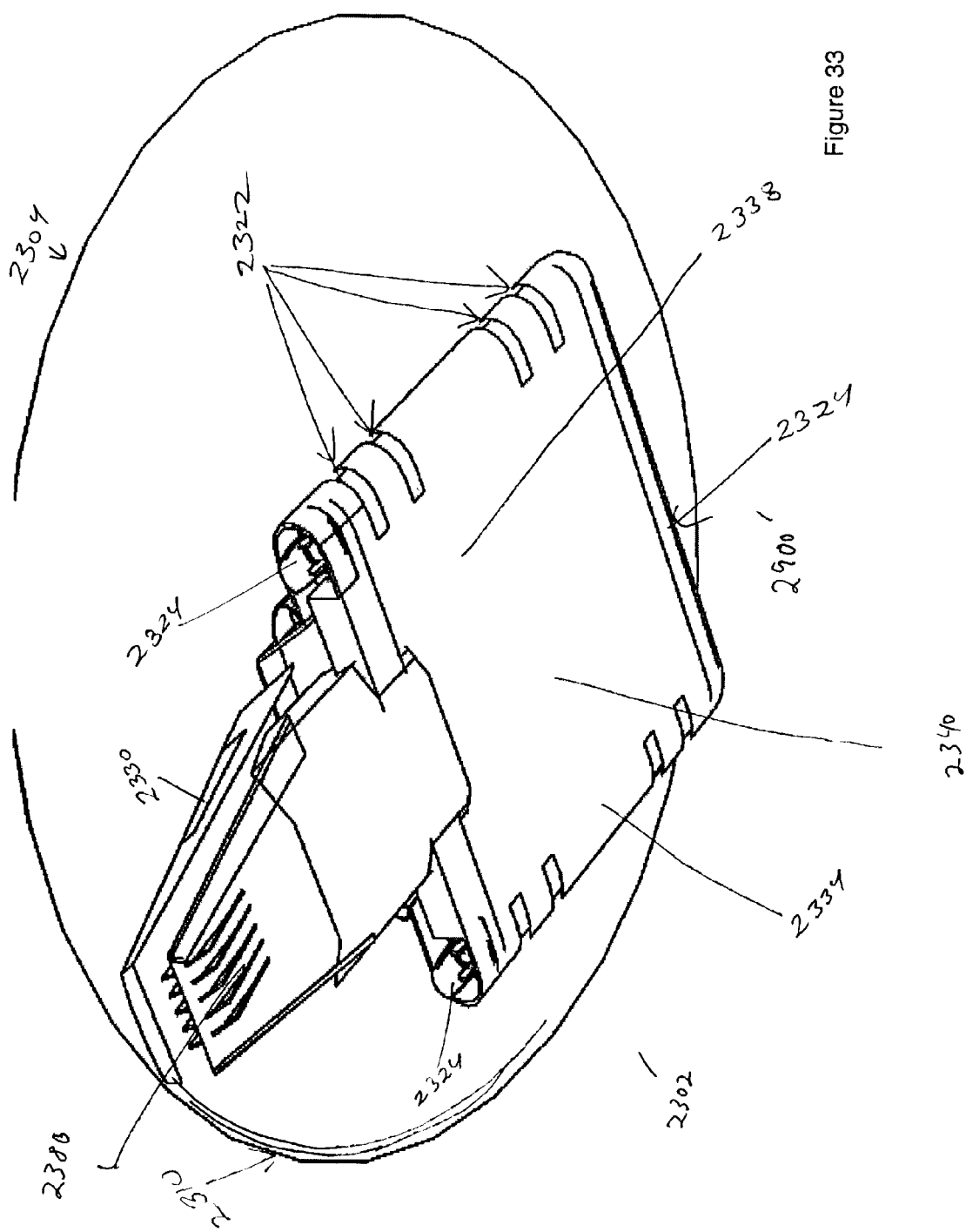

FIG. 22 illustrates an embodiment of a portion of the electric-energy lifting panel changing the air gap between the emitter wire layer and ion plate array. Several mechanisms exist to change the air gap 2259 between the emitter wire layer 2266 and ion plate array 2252.

FIGS. 23–28 illustrate various views of an embodiment of a personal flight vehicle. In an embodiment, a version of a personal flight vehicle 2302 that has an enclosure for a user to sit in may employ the electric-energy lifting panel which has two capacitive plates with different geometric dimensions to generate a net-directional force. An embodiment of the personal flight vehicle may have the following components: one or more electric-energy lifting panels 2304 having a first capacitive plate 2306 and a second capacitive plate 2308; a tortuous pivot frame 2310; one or more ion conditioners 2322, such as ultraviolet-light emitting bulbs, an Excimer laser or other similar device; a gaseous propulsion system 2324; one or more air-breathing rockets 2326 with hydrogen fuel support 2328; a flight situation display system 2330; a global positioning system navigation system 2320; Uncondensed hydrogen cylinders 2334; fuel cells 2338; an inductive transformer stack 2340; thermal slipstream enhancers 2380, Laser/ionization power module 2990, as well as other components.

When high voltage (−30 kV) is applied to a capacitor whose electrodes have different physical dimensions, the capacitor experiences a net force toward the smaller electrode. This operates on capacitors of various shapes.

The order of magnitude of the net force on the asymmetric capacitor may be estimated assuming two different primary mechanisms of charge conduction between its electrodes and a variety of secondary mechanisms. The primary mechanisms are ballistic ionic wind and ionic drift.

Calculations indicate that ionic wind may be at least three orders of magnitude too small to explain the magnitude of the observed force on the capacitor. The ionic drift transport assumption leads to the correct order of magnitude for the force. A thermodynamic treatment of the net force on an asymmetric capacitor also contributes to the effect. The thermodynamic treatment takes into account plasma effects: ionization of gas (or air) in the high electric field region, charge transport, and resulting dynamic forces on the electrodes. There may be some varying degrees of interdependence of the ion force on gas pressure, gas species and applied voltage.

When a high voltage (–30 kV) is applied to the electrodes of an asymmetric capacitor, a net force is observed on the capacitor. Asymmetric may mean that the physical dimensions of the two electrodes are different, i.e., one electrode is large and the other small.

In an embodiment, the largest force on the capacitor is in a direction from the negative (larger) electrode toward the positive (smaller) electrode. The force on the capacitor exceeds its weight. There is a force on the capacitor independent of the polarity of applied voltage. The greatest force on the capacitor is created when the small electrode is positive. The effect occurs in a dielectric medium which is air but future applications for space vehicle propulsion could be operate in a vacuum as well.

In the inverse effect: when a dielectric medium is made to move between high voltage electrodes, there is a change in the voltage on the electrodes. The asymmetric capacitor does show a net force, even in vacuum. Responsibility for the net force on an asymmetric capacitor may be dependant on whether the asymmetric capacitor is in a polarizable medium, iii air, or in vacuum. A net force is exerted on the capacitor when a high D.C. voltage is applied to the electrodes. With many different types of geometries, a common feature may be that one electrode is thin and the other very wide (asymmetric dimensions). Also, a suspended wire, representing a capacitor with the second electrode at infinity, showed lift.

In an embodiment, the force on the capacitor generally appeared in the direction toward the small electrode—independent of the orientation of the capacitor with respect to the plane of the Earth's surface. The significance of this observation is that the force may have nothing to do with the gravitational field of the Earth, and may have nothing to do with the electric potential of the Earth's atmosphere.

In an embodiment, the thin emitter wire electrode must be at a sufficient distance away from the ion plate so that arcing does not occur from the thin wire electrode to the foil, at the operating voltage. The edges of the capacitor, nearest to the thin wire, may be rounded over and pointing towards the ground to prevent arcing or corona discharge at sharp capacitive plate edges (which are closest to the thin wire).

The capacitor showed improved lift when rounded foil was put over the foil electrode closest to the thin wire, thereby smoothing-over the sharp foil edges. Physically, this means that the radius of curvature of the foil nearest to the small wire electrode was made larger, creating a greater asymmetry in radii of curvature of the two electrodes.

In an embodiment, when operated in air, the asymmetric capacitors exhibit a net force toward the smaller conductor and this force is independent of the D.C. voltage polarity. The detailed shape of the capacitor seems immaterial, as long as there is a large asymmetry between the characteristic size of the two electrodes.

Sonic manifestation may be produced in operation which appears as a peculiar hissing sound with pitch varying with the applied voltage. The personal flight vehicle may use sonic sensors as part of the flight control system to verify proper operation of the craft. This sound generally increases with air ionization or conditioning.

In an embodiment, the propulsion force may come from several different forces. The first is that there exists an ionic wind in the high field region between the capacitor electrodes, and that this ionic wind causes the electrodes to move as a result of the momentum recoil. Additionally, a drift current may exist between the capacitor plates. In this scheme, the order of magnitude of the force on an asymmetric capacitor is correct, however, this scheme may contribute as a scaling theory. Additionally there is a thermodynamic treatment of the force on an asymmetric capacitor The most common explanation for the net force on an asymmetric capacitor invokes ionic wind. Under a high voltage D.C. bias, ions are thought to be accelerated by the high potential difference between electrodes, and the recoil force is observed on an asymmetric capacitor. Consider a capacitor that operates at voltage V. Charged particles of mass in, having charge q, such as electrons or (heavy) ions, are accelerated to a velocity v, having a kinetic energy Another possibility is that heavy ions (from the air or stripped off the wire) are responsible for the ionic wind. As the heaviest ions around, assume that Cu is being snipped from the wire. Using Cu for the ions, the mass of the ions is 63.55 mi, where 63.55 i5 the atomic mass of Cu and MR is the mass of a proton. The force of the ionic wind this effect will operate in vacuum, and may contribute to the overall force on a capacitor.

One can compute an upper limit to the force on a capacitor due to ionic wind effects. Ionic wind is a ballistic flow of charges from one electrode to the other. There is another type of classical transport: drift of charge carriers in an electric field. In the case of drift, the carriers do not have ballistic trajectories, instead they experience collisions on their paths between electrodes. However, due to the presence of an electric field, the carriers have a net motion toward the opposite electrode This type of transport picture is more accurate (than ballistic ionic wind) for a capacitor whose gap contains air.

The positive and negative electrodes of the capacitor are charged and that these charges experience different forces, because the electric field surrounding the capacitor is nonuniform. The electric field surrounding the capacitor is created by the potential applied to the capacitor electrodes and partial ionization of air into positive ions and electrons. These charge carriers experience drift and diffusion in the resulting electric field. The high voltage DC power supply or main energy source supplies the energy that is dissipated by transport of carriers in the electric field. The electric field is particularly complicated because it is the result of a steady state: the interplay between the dynamics of ionization of the air in the high-field region surrounding the electrodes, and charge transport (drift and diffusion of positive and negative carriers) in the resulting electric field.

If the capacitor is surrounded by vacuum (rather than a dielectric, such as air), the net force F on the asymmetric capacitor can be computed by the sum of two surface integrals, one over the surface of the positive electrode and one over the surface of the negative electrode. An alternative but equivalent picture is that the capacitor is an electric dipole in an nonuniform electric field that it has produced, and the ions form an electronic maple syrup, due to their high mass and resulting low mobility.

The energy flow from the positive corona wire to the negative foil below may not be a straight line of energy but an outflowing balloon shaped cascade of energy that is moving towards the lower negative ion-plate. One embodiment causes the energy to miss the lower ion plate and to create thrust by flying past it and downwards in increasing power.

Therefore, the physical picture is that in the high field region the electrons, with their high mobility, are swept out by the electric field, toward the thin wire electrode and cause dynamic screening of the potential (Dielectric screening due to polarized air atoms will also take place.) However, the massive (probably positive) ions are less mobile and are left behind in a plasma surrounding the thin wire electrode. An asymmetric capacitor may have a mass that is two orders or magnitude greater. Consequently, drift of electrons may not fully explain the observed force on the capacitor.

FIGS. 29–33 illustrate various views of an embodiment of a personal flight vehicle. In an embodiment, a version of a personal flight vehicle 2900 that has an enclosure for a user to sit in may employ the electric-energy lifting panel which has two capacitive plates with different geometric dimensions to generate a net-directional force.

As noted above, an alternative to using the value of electron mobility is to use the smaller value of ionic mobility. This will lead to a larger force because the force is inversely proportional to the mobility.

When a high voltage is applied to the asymmetric capacitor, for example, positive voltage on the thin emitter wire layer and negative voltage on the ion plate arrays, the high electric field around the thin wire ionizes the atoms of the air. There is comparatively little ionization near the ion plate arrays due to the lower magnitude electric field near the ion plate arrays. The ionized atoms around the ion plate arrays form a plasma, consisting of charged electrons and positively charged ions.

The electron drift current leads to a force on the capacitor that may be too small to fully explain the effect on the capacitor. Using the value of mobility appropriate for (nitrogen) ions leads to a force magnitude in agreement with the reality of the effect.

Note that the force given scales inversely with the mobility p. If the ions are responsible for providing the required small mobility, then the idea is that the ions are like a low-mobility syrup, which provides a large space-charge to attract the negatively charged ion plate arrays electrode. As soon as the ion plate arrays electrode moves toward the positive ion cloud. Another positive ionic cloud is set up around the thin emitter wire electrode, using the energy from the voltage source. In this way, the dipole (asymmetric capacitor) moves in the non-uniform electric field that it has created.

The force, generated on an asymmetric capacitor, can be described by the thermodynamics of a fluid dielectric in an external electric field produced by charged conductors. The (partially ionized) air between capacitor electrodes is the fluid dielectric. Although the air is partially ionized, we assume that this fluid dielectric is close to neutral on the macroscopic scale. The charged conductors are the asymmetric electrodes of the capacitor. The batten provides the charge on the electrodes and the energy sustain the electric field in the air (dielectric) surrounding the capacitor electrodes.

The system may include several parts: the partially ionized air dielectric, the metal electrodes of the capacitor and the battery (voltage source), and the electromagnetic field. The battery/DC power supply in the remote power broadcast is simply a large reservoir of charge. The total momentum including the electromagnetic field of this system may be constant.

As far as the electric field is concerned, its total momentum changes little during the operation of the capacitor, because the field is in a steady state; energy is supplied by the battery (charge reservoir). So the personal flight vehicle sets the rate of change of field momentum to zero, giving a relation between the force on the electrodes and the dielectric:

The thermodynamic theory of the net force on a capacitor that is immersed in a nonlinear dielectric fluid, such as air in a high electric field. The main result for the net force on the capacitor is given in Eq. The thermodynamic theory uses the dielectric properties of the gas surrounding the capacitor plates. The personal flight vehicle uses a control mechanism to manage the high-field dielectric properties of the fluid, which is air in this case.

In an embodiment, Cesium ions can be introduced into the operating air (fluid) envelope of the aircraft to provide additional thrust.

Figure 34:
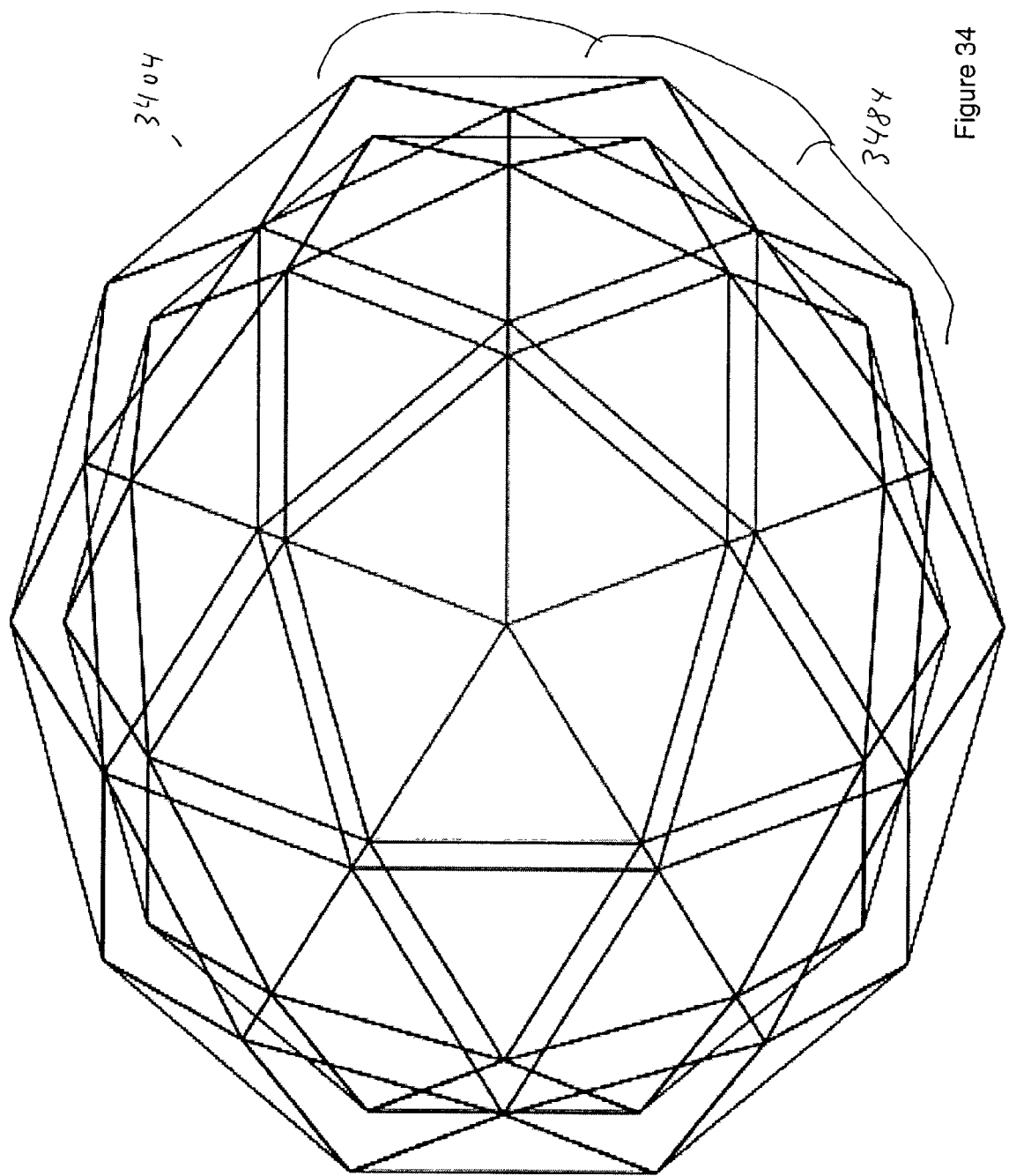
FIGS. 34 and 35 illustrate electric-energy lifting panels in the shape of a three dimension triangular sphere.
Figure 35:
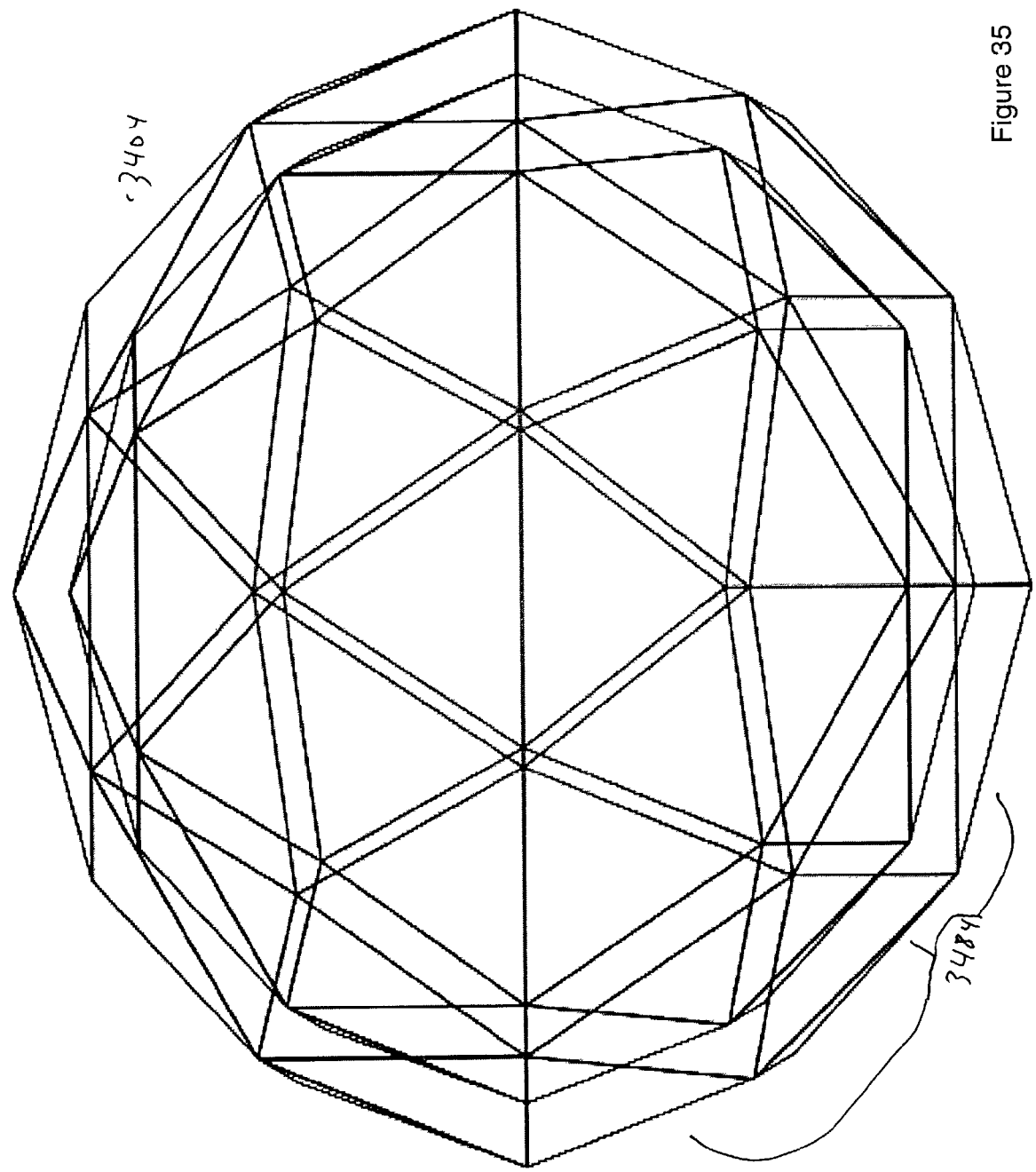

FIGS. 34 and 35 illustrate electric-energy lifting panels in the shape of a three dimension triangular sphere. The electric-energy lifting panels 3404 in the shape of a three dimension triangular sphere can be used as the outer shell of the personal flight vehicle or as steering pods with separate addressing of each triangular section for steering. The corona wire-ion plate arrays form in each triangular section 3484. All of the triangular sections 3484 assemble to form a Buckminster Fuller geodesic dome or sphere.

While some specific embodiments of the invention have been shown the invention is not to be limited to these embodiments. The invention is to be understood as not limited by the specific embodiments described herein, but only by scope of the appended claims.

What is claimed is:

1. An apparatus, comprising:
an electric-energy lifting panel including a first capacitive plate and a second capacitive plate having different geometric dimensions to generate a net-directional force, the electric-energy lifting panel to levitate a user secured to the electric-energy lifting panel; tortuous pivot frame attached to the panel to allow the panel to redirect vertical flight to horizontal thrust
an ion conditioner to ion enhance an amount of ions in the air around the first capacitive plate and the second capacitive plate; and
a gaseous propulsion system operable to provide at least a directional thrust and vertical lift during take off for the electric-energy lifting panel.

2. The apparatus of claim 1, wherein the second capacitive plate is a layer of emitter wire.

3. The apparatus of claim 1, wherein the ion conditioner comprises a laser.

4. The apparatus of claim 1, wherein the ion conditioner comprises ultra violet light emitting bulbs.

5. The apparatus of claim 1, wherein the ion conditioner also conditions the amount of ions the air between the first capacitive plate and the second capacitive plate.

6. The apparatus of claim 1, wherein High-K dielectric material is in between the first capacitive plate and the second capacitive plate.

7. A flight vehicle, comprising:
a panel to levitate a user secured to the flight vehicle via electric-energy, wherein the panel provides vertical lift;
a body harness;

a tortuous pivot frame attached to the panel to allow the panel to redirect vertical lift to horizontal thrust;

an inductive transformer to provide electric-energy to the panel; and a gaseous propulsion system operable to provide a directional thrust and a vertical lift during flight, take off, and landing for the flight vehicle, wherein the body harness couples to the gaseous propulsion system.

8. The flight vehicle of claim 7, wherein the tortuous pivot frame is composed of composite materials.

9. The flight vehicle of claim 7, wherein the gaseous propulsion system further comprises:

an air-breathing rocket with hydrogen fuel support.

10. The flight vehicle of claim 7, further comprising:

a fuel cell stack that uses air as an oxidizer.

11. The flight vehicle of claim 7, further comprising:

a solid-state hydrogen storage and recovery system to supply hydrogen for a fuel cell stack.

12. The flight vehicle of claim 7, wherein the panel is located above the user.

13. The flight vehicle of claim 7, wherein the panel is located under the user.

14. The flight vehicle of claim 7, wherein the body harness has vertical telescoping posts with foldout foot pads and a flip and lock waist dashboard, the panel includes a first capacitive plate and a second capacitive plate having different geometric dimensions to generate a net-directional force, and an ion conditioner attaches to the flight vehicle to ion enhance an amount of ions in the air around the first capacitive plate and the second capacitive plate.

15. The flight vehicle of claim 7, further comprising:

a flight situation display system for the user.

16. The flight vehicle of claim 15, further comprising:

a global positioning system navigation system to send and receive data from the flight situation display system.

17. The flight vehicle of claim 7, further comprising:

an Electro Magnetic Field shield built into a helmet of the user and an Electro magnetic field deflector built into the panel.

18. The flight vehicle of claim 7, further comprising:

an emergency parachute/parasail for the user.

19. An apparatus, comprising:

an electric-energy lifting panel including a first capacitive plate and a second capacitive plate having different geometric dimensions to generate a net-directional force, the electric-energy lifting panel to levitate a user;

tortuous pivot frame attached to the panel to allow the panel to redirect vertical flight to horizontal thrust a gaseous propulsion system to provide a directional thrust and at least additional vertical lift during take off and landing for the apparatus; and an inductive transformer to provide electric-energy to the first capacitive plate and the second capacitive plate, wherein a network of two or more towers having a Direct Current power-supply to inductively provide a pulsating Direct Current to the inductive transformer.

20. The apparatus of claim 19, further comprising:

an ion conditioner to ion enhance an amount of ions in the air around the first capacitive plate and the second capacitive plate and between the first and second plate.

21. The apparatus of claim 19, wherein the first capacitive plate includes a plurality of parallel and layered series of ion plates.

22. The apparatus of claim 19, wherein the electric-energy lifting panel has an electrically-grounded skirt of aluminum plate that surrounds a portion of the electric-energy lifting panel.

23. The apparatus of claim 22, further comprising:

a means for supplying pulsating direct current to the means levitating the user.

24. A system, comprising:

a flight vehicle that includes an electric-energy lifting panel and an inductive transformer, wherein the electric-energy lifting panel has a first capacitive plate and a second capacitive plate that have different geometric dimensions in order to generate a net-directional force, the electric-energy lifting panel to levitate a user, and wherein the inductive transformer operable to provide electric-energy to the first capacitive plate and the second capacitive plate, an ion conditioner to ion enhance an amount of ions in the air around the first capacitive plate and the second capacitive plate, a gaseous propulsion system to provide a directional thrust and at least additional vertical lift during take off, and a tortuous pivot frame attached to the panel to allow the electric-energy lifting panel to redirect vertical lift to horizontal thrust; and a network of two or more towers having a Direct Current power-supply to inductively supply a pulsating Direct Current to the inductive transformer.

25. The apparatus of claim 22, further comprising:

means for projecting an electromagnetic stream to the means for levitating a user and then redirecting the electromagnetic stream to at least one of a surface of the Earth or the air.

* * * * *